US012659094B2

(12) United States Patent
Asterjadhi et al.

(10) Patent No.: US 12,659,094 B2
(45) Date of Patent: Jun. 16, 2026

(54) MULTI-LINK MANAGEMENT

(71) Applicant: QUALCOMM Incorporated, San Diego, CA (US)

(72) Inventors: Alfred Asterjadhi, San Diego, CA (US); Abhishek Pramod Patil, San Diego, CA (US); George Cherian, San Diego, CA (US); Yanjun Sun, San Diego, CA (US); Sai Yiu Duncan Ho, San Diego, CA (US); Gaurang Naik, San Diego, CA (US); Abdel Karim Ajami, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/946,966

(22) Filed: Sep. 16, 2022

(65) Prior Publication Data

US 2024/0097840 A1      Mar. 21, 2024

(51) Int. Cl.
*H04L 5/00*          (2006.01)

(52) U.S. Cl.
CPC .................................. *H04L 5/0044* (2013.01)

(58) Field of Classification Search
CPC .................................................... H04L 5/0044
See application file for complete search history.

(56) References Cited

U.S. PATENT DOCUMENTS

| | | | |
|---|---|---|---|
| 2022/0029736 A1 | 1/2022 | Chu et al. | |
| 2023/0128915 A1* | 4/2023 | Kim ...................... | H04L 1/1896 |
| | | | 370/329 |
| 2024/0007904 A1* | 1/2024 | Ratnam ............. | H04W 72/1273 |

(Continued)

OTHER PUBLICATIONS 802 11 Working Group of the LAN/MAN Standards Committee of the IEEE Computer Society: "IEEE P802.11be™/D2.2, Draft Standard for Information Technology—Telecommunications and Information Exchange between Systems Local and Metropolitan Area Networks—Specific requirements, Part 11: Wireless LAN Medium Access Control (MAC) and Physical Layer (PHY) Specifications, Amendment 8: Enhancements for Extremely High Throughput (EHT)", Piscataway, NJ, USA, Oct. 2022, pp. 217-220, 268, 487-488 and 550.

(Continued)

*Primary Examiner* — Kevin M Cunningham
(74) *Attorney, Agent, or Firm* — Loza & Loza, LLP

(57) ABSTRACT

Aspects relate to multi-link communication. In some examples, a communication frame carries a multi-link information element (ML IE). The ML IE includes a bitmap and one or more information sub-elements. In some examples, the bitmap indicates the links of a set of radio links to which the information sub-elements apply. In some examples, a frame may carry multiple ML IEs. In some examples, different ML IEs in the same frame may include the same bitmap, where the different ML IEs may carry different information sub-elements for the radio links indicated by the bitmap. In some examples, an ML IE serves to indicate that information sub-elements that are located in the frame body of the frame at a location that precedes the ML IE in the frame body apply to different radio links than the radio links indicated by the bitmap of the ML IE.

21 Claims, 21 Drawing Sheets

(56) References Cited

U.S. PATENT DOCUMENTS

2024/0244481 A1*    7/2024    Viger ............... H04W 28/0278

OTHER PUBLICATIONS

Gan M, (Huawei): "Proposed Draft Text for TWT for MLD", IEEE Draft, IEEE-SA Mentor, Piscataway, NJ, USA, vol. 802.11 EHT, 802.11be, No. 9, Jun. 9, 2021, XP068182074, 5 Pages, The Whole Document.
International Search Report and Written Opinion—PCT/US2023/074242—ISA/EPO—Jan. 5, 2024.
Shafin R, (Samsung Research America): "Resolution for CIDs in CC36-CC36 CR on Broadcast TWT for MLD", IEEE Draft, IEEE-SA Mentor, Piscataway, NJ, USA, vol. 802.11 EHT, 802.11be, No. 5, May 12, 2022, 13 Pages, XP068190567, The Whole Document.

* cited by examiner

900

| Request Type | Target Wake Time | TWT Group Assignment | Normal Minimum TWT Wake Duration | TWT Wake Interval Mantissa | TWT Channel | NDP Paging (optional) | Link ID Bitmap |
|---|---|---|---|---|---|---|---|
| 902 | 904 | 906 | 908 | 910 | 912 | 914 | 916 |

Octets: 2 | 0 - 8 | 0.3 to 9 | 1 | 2 | 1 | 0 or 4 | 0 or 2

1000

| 1002 | 1004 | 1006 | 1008 |
|---|---|---|---|
| Element ID | Length | Element ID Extension | Link ID Bitmap |
| 1 | 1 | 1 | 2 |

Octets

1400

1402

| Type subfield value | Multi-Link element variant name |
|---|---|
| 0 | Basic (see 9.4.2.312.2 (Basic Multi-Link element) |
| 1 | Probe Request (see 9.4.2.312.3 (Probe Request Multi-Link element) |
| 2 | Reconfiguration (see 9.4.2.312.4 (Reconfiguration Multi-Link element) |
| 3 | TDLS (see 9.4.2.312.5 (TDLS MultLink element) |
| 4 | Priority Access (see 9.4.2.312.6 (Priority Access Multi-Link element)) |
| 5 | Link information variant LM element |
| 6-7 | Reserved |

| Element ID | Length | Element ID Extension | Multi-Link Control | Link Info |
|:---:|:---:|:---:|:---:|:---:|
| 1502 | 1504 | 1506 | 1508 | 1510 |
| 1 | 1 | 1 | 2 | variable |

Octets

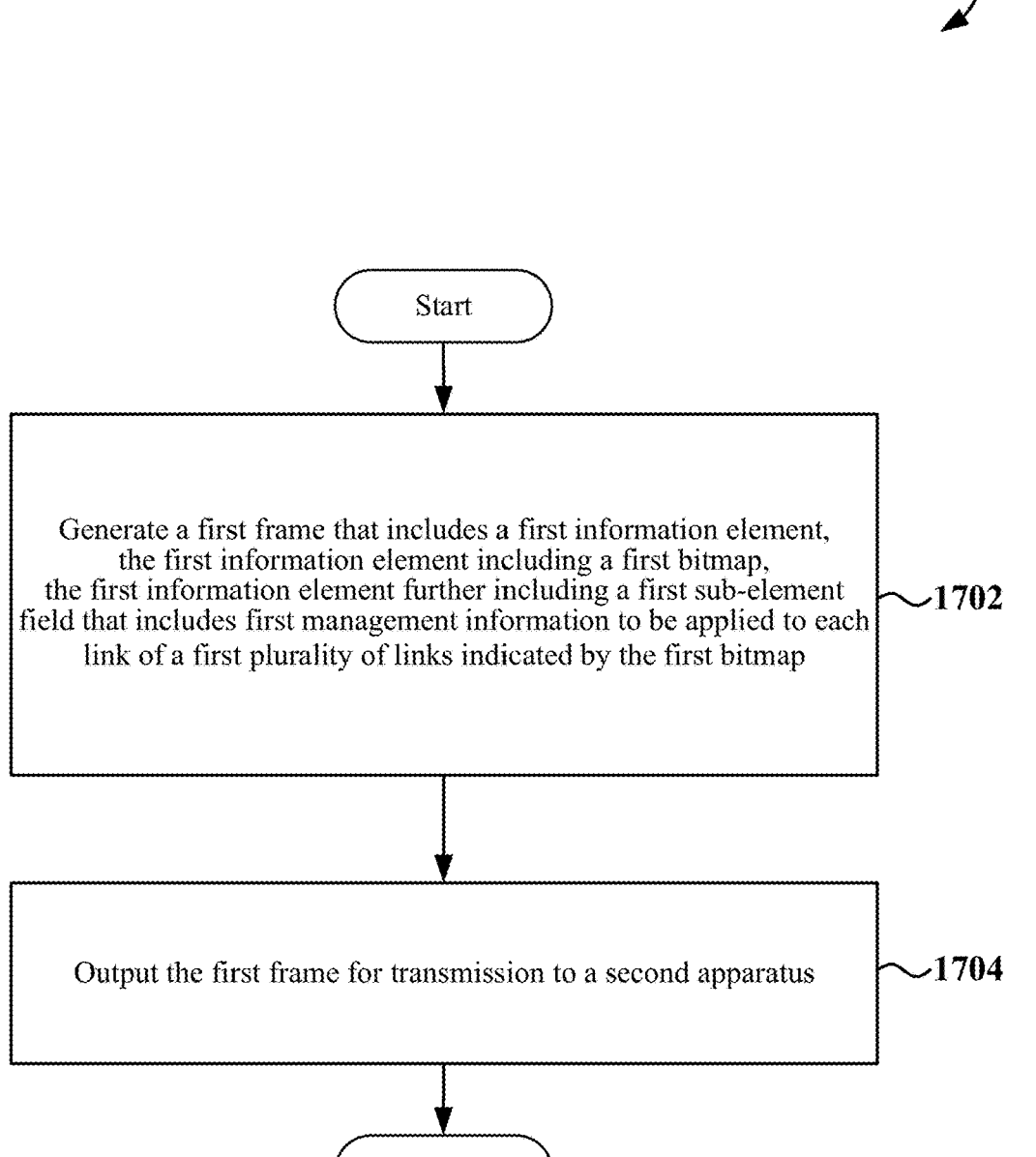

1700

Start

Generate a first frame that includes a first information element,
the first information element including a first bitmap,
the first information element further including a first sub-element
field that includes first management information to be applied to each
link of a first plurality of links indicated by the first bitmap — 1702

Output the first frame for transmission to a second apparatus — 1704

End

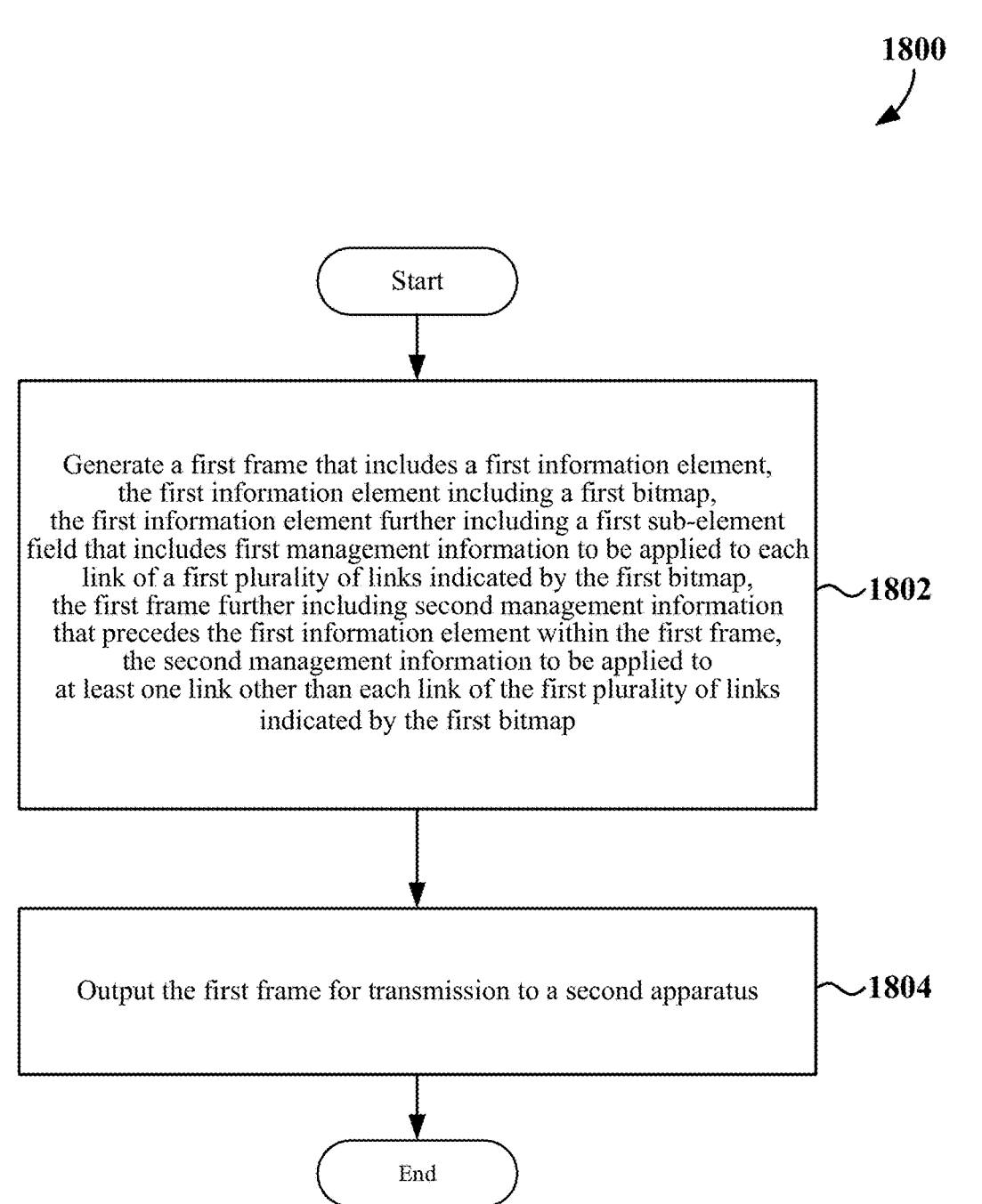

Start

Generate a first frame that includes a first information element,
the first information element including a first bitmap,
the first information element further including a first sub-element
field that includes first management information to be applied to each
link of a first plurality of links indicated by the first bitmap,
the first frame further including second management information
that precedes the first information element within the first frame,
the second management information to be applied to
at least one link other than each link of the first plurality of links
indicated by the first bitmap                                    ~1802

Output the first frame for transmission to a second apparatus   ~1804

End

FIG. 18

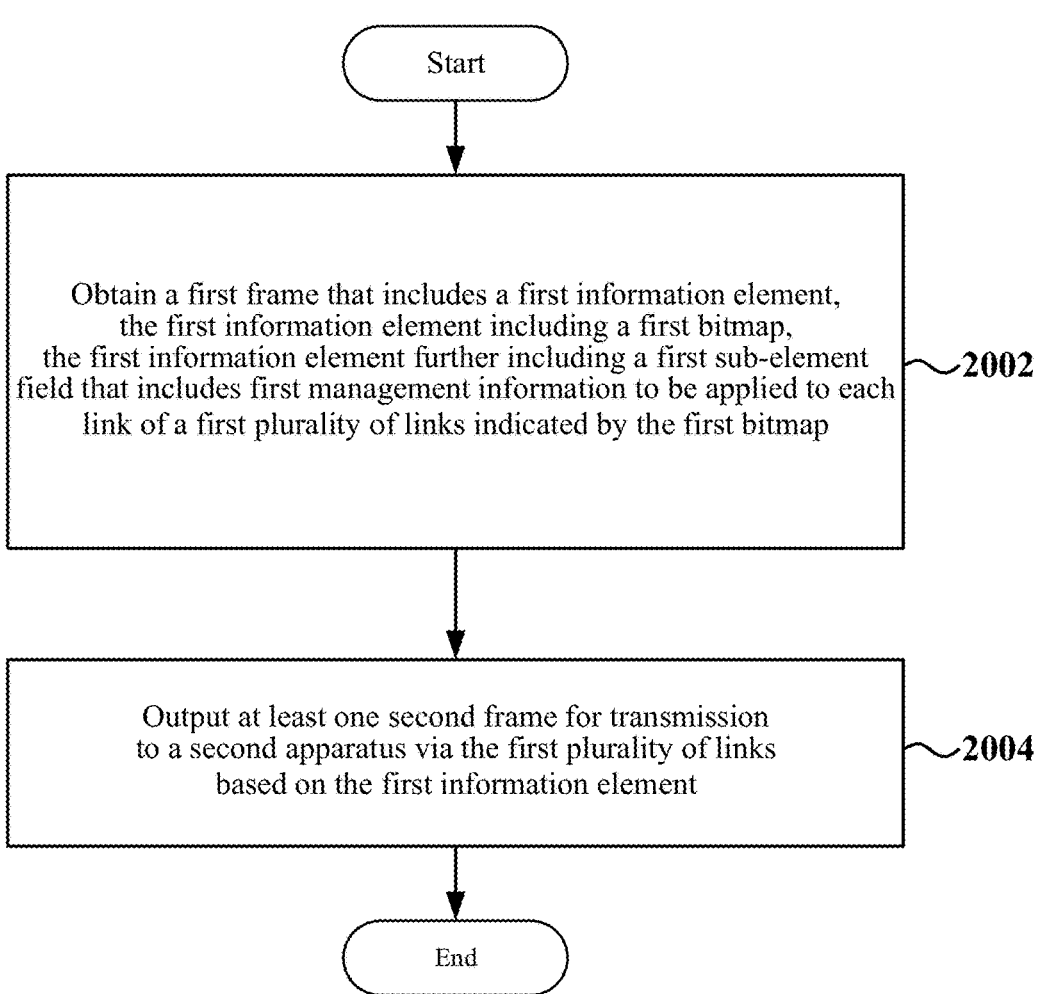
FIG. 20

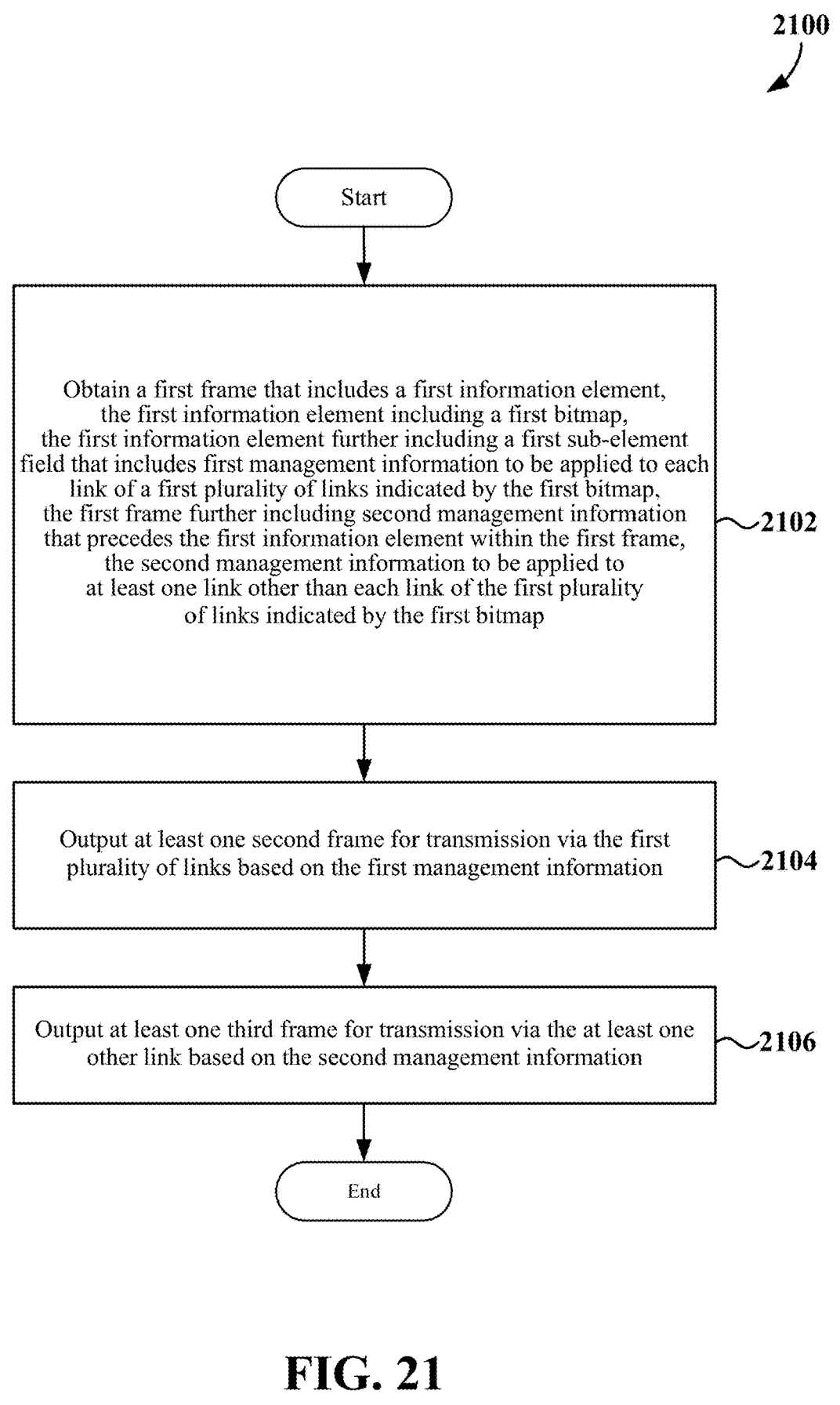

2100

Start

Obtain a first frame that includes a first information element,
the first information element including a first bitmap,
the first information element further including a first sub-element
field that includes first management information to be applied to each
link of a first plurality of links indicated by the first bitmap,
the first frame further including second management information
that precedes the first information element within the first frame,
the second management information to be applied to
at least one link other than each link of the first plurality
of links indicated by the first bitmap                                    ~2102

Output at least one second frame for transmission via the first
plurality of links based on the first management information          ~2104

Output at least one third frame for transmission via the at least one
other link based on the second management information                ~2106

End

FIG. 21

MULTI-LINK MANAGEMENT

TECHNICAL FIELD

The technology discussed below relates generally to wireless communication and, more particularly, to managing multi-link transmissions.

INTRODUCTION

Wireless communication networks are widely deployed to provide various communication services. Some of these networks may be multiple access networks that support communication for multiple users by sharing available network resources. For example, a wireless communication device (e.g., a station) may communicate with another wireless communication device (e.g., an access point or a station) of a network to gain access to communication services provided by the network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first apparatus for wireless communication may include a processing system. The processing system may be configured to generate a first frame that includes a first information element. In some examples, the first information element includes a first bitmap. In some examples, the first information element further includes a first sub-element field that includes first management information to be applied to each link of a first plurality of links indicated by the first bitmap. The processing system may also be configured to output the first frame for transmission to a second apparatus.

In some examples, a method for wireless communication at a first apparatus is disclosed. The method may include generating a first frame that includes a first information element. In some examples, the first information element includes a first bitmap. In some examples, the first information element further includes a first sub-element field that includes first management information to be applied to each link of a first plurality of links indicated by the first bitmap. The method may also include outputting the first frame for transmission to a second apparatus.

In some examples, a first apparatus for wireless communication may include means for generating a first frame that includes a first information element. In some examples, the first information element includes a first bitmap. In some examples, the first information element further includes a first sub-element field that includes first management information to be applied to each link of a first plurality of links indicated by the first bitmap. The first apparatus may also include means for outputting the first frame for transmission to a second apparatus.

In some examples, a non-transitory computer-readable medium has stored therein instructions executable by a processing system of a first apparatus to generate a first frame that includes a first information element. In some examples, the first information element includes a first bitmap. In some examples, the first information element further includes a first sub-element field that includes first management information to be applied to each link of a first plurality of links indicated by the first bitmap. The computer-readable medium may also have stored therein instructions executable by the processing system of the first apparatus to output the first frame for transmission to a second apparatus.

In some examples, a first apparatus for wireless communication may include a processing system. The processing system may be configured to obtain a first frame that includes a first information element. In some examples, the first information element includes a first bitmap. In some examples, the first information element further includes a first sub-element field that includes first management information to be applied to each link of a first plurality of links indicated by the first bitmap. The processing system may also be configured to output at least one second frame for transmission via the first plurality of links based on the first information element.

In some examples, a method for wireless communication at a first apparatus is disclosed. The method may include obtaining a first frame that includes a first information element. In some examples, the first information element includes a first bitmap. In some examples, the first information element further includes a first sub-element field that includes first management information to be applied to each link of a first plurality of links indicated by the first bitmap. The method may also include outputting at least one second frame for transmission via the first plurality of links based on the first information element.

In some examples, a first apparatus for wireless communication may include means for obtaining a first frame that includes a first information element. In some examples, the first information element includes a first bitmap. In some examples, the first information element further includes a first sub-element field that includes first management information to be applied to each link of a first plurality of links indicated by the first bitmap. The first apparatus may also include means for outputting at least one second frame for transmission via the first plurality of links based on the first information element.

In some examples, a non-transitory computer-readable medium has stored therein instructions executable by a processing system of a first apparatus to obtain a first frame that includes a first information element. In some examples, the first information element includes a first bitmap. In some examples, the first information element further includes a first sub-element field that includes first management information to be applied to each link of a first plurality of links indicated by the first bitmap. The computer-readable medium may also have stored therein instructions executable by the processing system of the first apparatus to output at least one second frame for transmission via the first plurality of links based on the first information element.

In some examples, a station may include a transceiver and a processing system. The processing system may be configured to generate a first frame that includes a first information element. In some examples, the first information element includes a first bitmap. In some examples, the first information element further includes a first sub-element field that includes first management information to be applied to each link of a first plurality of links indicated by the first bitmap. The transceiver may be configured to transmit the first frame to a wireless node.

In some examples, an access point may include a transceiver and a processing system. The transceiver may be configured to receive a first frame that includes a first information element. In some examples, the first information element includes a first bitmap. In some examples, the first information element further includes a first sub-element field that includes first management information to be applied to each link of a first plurality of links indicated by the first bitmap. The transceiver may also be configured to transmit at least one second frame via the first plurality of links based on the first information element.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 14 is a conceptual illustration of an example of a multi-link element type field according to some aspects.

FIG. 17 is a flow chart illustrating an example communication method involving generating a frame according to some aspects.

FIG. 18 is a flow chart illustrating an example communication method involving generating a frame according to some aspects.

FIG. 20 is a flow chart illustrating an example communication method involving obtaining a frame according to some aspects.

FIG. 21 is a flow chart illustrating an example communication method involving obtaining a frame according to some aspects.

DETAILED DESCRIPTION

Figure 1:
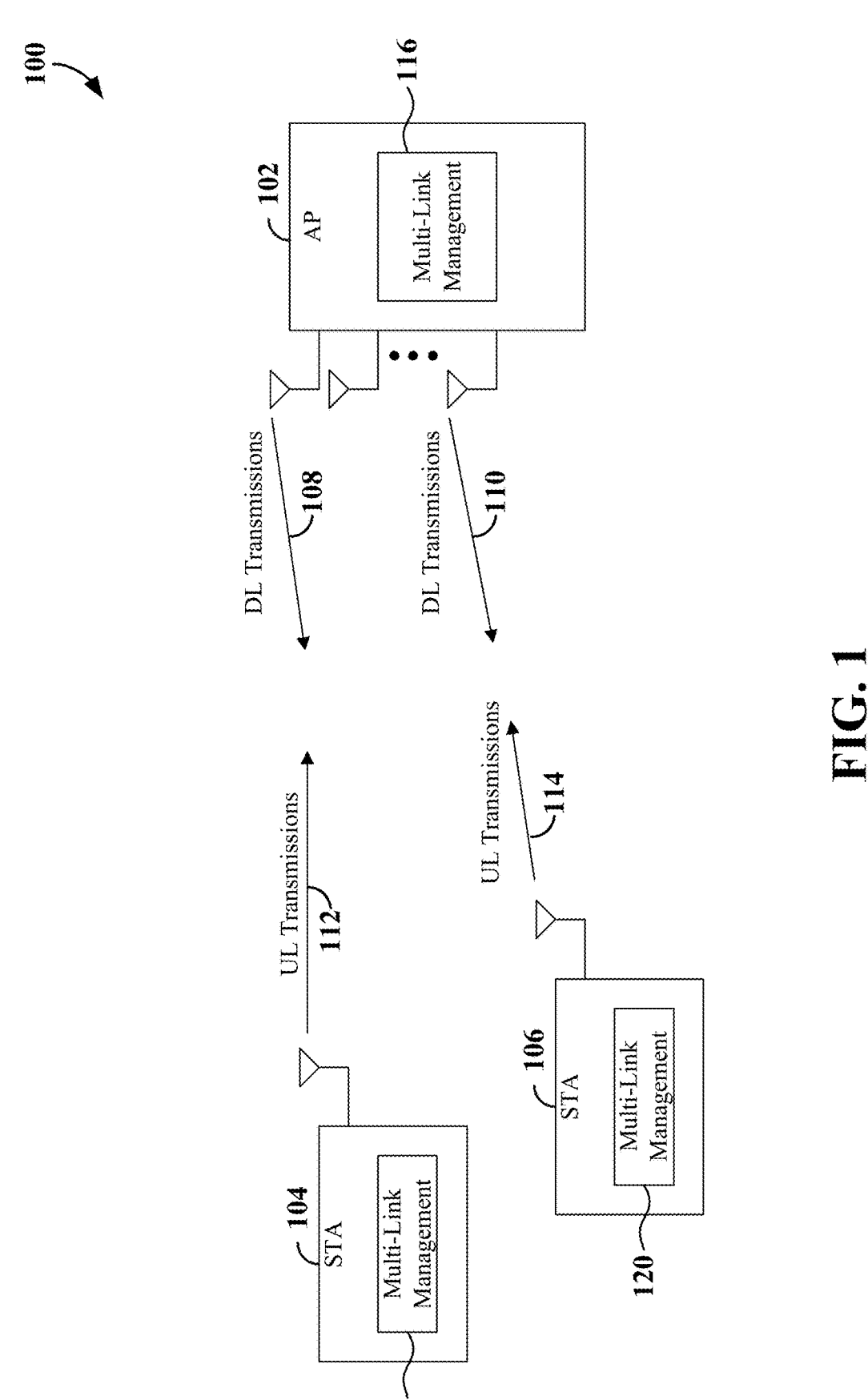
FIG. 1 is a conceptual illustration of an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Various aspects of the disclosure relate to multi-link communication in a wireless local area network (WLAN). In some examples, a first multi-link device (MLD) may communicate with multiple devices via multiple radio links. In some examples, a first MLD may communicate with a second MLD via multiple radio links. In some examples, the radio links are carried on the same radio frequency (RF) channel or RF band. In some examples, the radio links are carried on different RF channels or RF bands.

The disclosure relates in some aspects to a communication frame (e.g., a WLAN frame) that carries a multi-link information element (ML IE). The ML IE includes a bitmap and one or more information sub-elements. In some examples, the bitmap indicates the links of a set of radio links to which the information sub-elements apply.

In some examples, a frame may carry multiple ML IEs. In some examples, different ML IEs in the same frame may include the same bitmap. In this case, the different ML IEs may carry different information sub-elements for the radio links indicated by the bitmap.

In some examples, an ML IE serves to indicate that information sub-elements that are located in the frame body of the frame at a location that precedes the ML IE in the frame body apply to different radio links than the radio links indicated by the bitmap of the ML IE. In some examples, the information sub-elements that precede an ML IE apply to a current radio link of a device. In some examples, the information sub-elements that precede an ML IE apply at the MLD level.

FIG. 1 illustrates an example of a wireless communication system 100 where an access point (AP) 102 communicates with a first station (STA) 104 and a second STA 106. In some examples, the AP 102 may correspond to any of the APs or other apparatuses described in any one or more of FIGS. 2, 3, 6, 7, 16, and 19. In some examples, the STAs 104 and 106 may correspond to any of the STAs or other apparatuses described in any one or more of FIGS. 2, 3, 6, 7, 16, and 19.

The AP 102 may transmit downlink (DL) transmissions 108 and 110 to the first STA 104 and the second STA 106, respectively, via one or more links. In addition, the first STA 104 may transmit uplink (UL) transmissions 112 to the AP 102 via one or more links and second STA 106 may transmit UL transmissions 114 to the AP 102 via one or more links.

The AP 102, the first STA 104, and the second STA 106 include multi-link management components 116, 118, and 120, respectively. In some examples, the multi-link management component 116 may cooperate with the multi-link management component 118 to exchange management information used for multi-link transmissions such as the DL transmissions 108 and the UL transmissions 112. Similarly, the multi-link management component 116 may cooperate with the multi-link management component 120 to exchange management information used for multi-link transmissions such as the DL transmissions 110 and the UL transmissions 114.

Figure 2:
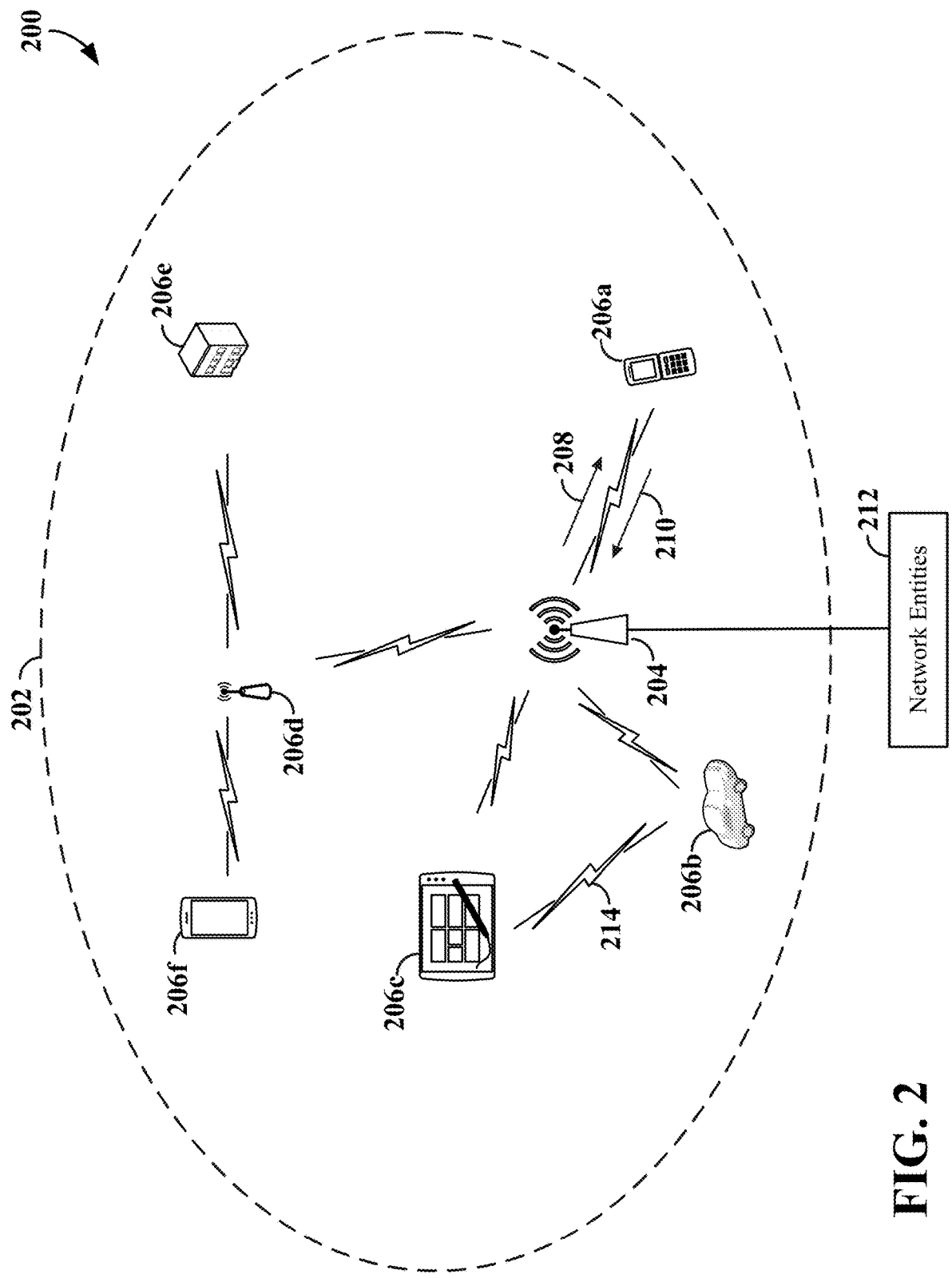
FIG. 2 is a conceptual illustration of another example of a wireless communication system according to some aspects.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a wireless communication system 200 including various wireless communication nodes. For convenience, a wireless communication node may be referred to herein as a wireless node. In some examples, the wireless communication system 200 may operate pursuant to a wireless communication standard, for example, the Institute of Electrical and Electronics Engineers (IEEE) 802.11 standard.

In some examples, a wireless node is a node (e.g., a device, an entity, etc.) that utilizes wireless spectrum (e.g., the radio frequency (RF) spectrum) to communicate with another node. In some examples, a wireless node may be a mobile apparatus. A mobile apparatus may be referred to as a STA in IEEE 802.11, but may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

A mobile apparatus need not necessarily have a capability to move, and may be stationary. The term mobile apparatus or mobile device broadly refers to a diverse array of devices and technologies. Mobile apparatuses may include a number of hardware structural components sized, shaped, and arranged to help in communication. Such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may be a digital home or smart home device such as a home audio, video, and/or multimedia device, an appliance, a vending machine, intelligent lighting, a home security system, a smart meter, etc. A mobile apparatus may be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, the communicated information of which may be given preferential treatment or prioritized access over other types of information, e.g., in terms of prioritized access for transport of critical service data, and/or relevant quality of service (QoS) for transport of critical service data.

In some examples, a wireless node may be an access point. In 802.11, an access point may be a network element in a radio access network responsible for radio transmission and reception in one or more service sets. In different technologies, standards, or contexts, an access point may variously be referred to by those skilled in the art as a base station, a base transceiver station (BTS), a radio base station, a radio transceiver, a transceiver function, a basic service set (BSS), an extended service set (ESS), a Node B (NB), an eNode B (eNB), a gNode B (gNB), a transmission and reception point (TRP), or some other suitable terminology.

In the example of FIG. 2, an access point (AP) 204 is deployed in a network to provide access to one or more services (e.g., network connectivity) for one or more stations (STAs) such as the STAs 206a, 206b, 206c, 206d, 206e, and 206f (which may be referred to herein collectively as STAs 206 or separately as a STA 206) that may be installed within or that may roam throughout a coverage area of the network. Thus, at various points in time, a STA 206 may connect to the AP 204 or to some other access point in the network (not shown). In some examples, the AP 204 may be referred to as an AP STA. In some examples, the STAs 206 may be referred to as non-AP STAs.

A variety of processes and methods may be used for transmissions in the wireless communication system 200 between the AP 204 and the STAs 206. For example, signals may be sent and received between the AP 204 and the STAs 206 in accordance with orthogonal frequency-division multiplexing (OFDM) and orthogonal frequency-division multiple access (OFDMA) techniques. In this case, the wireless communication system 200 may be referred to as an OFDM/OFDMA system. However, within the scope of the disclosure, multiplexing and multiple access are not limited to the above schemes, and may be provided utilizing time division multiple access (TDMA), code division multiple access (CDMA), frequency division multiple access (FDMA), spatial division multiple access (SDMA), sparse code multiple access (SCMA), resource spread multiple access (RSMA), or other suitable multiple access schemes.

A communication link that facilitates transmission from the AP 204 to one or more of the STAs 206 may be referred to as a downlink (DL) (e.g., the downlink 208), and a communication link that facilitates transmission from one or more of the STAs 206 to the AP 204 may be referred to as an uplink (UL) (e.g., the uplink 210). Alternatively, a downlink 208 may be referred to as a forward link or a forward channel, and an uplink 210 may be referred to as a reverse link or a reverse channel. Other terminology may be used for these links in other examples.

The AP 204 may act as a base station and provide wireless communication coverage in a basic service area (BSA) 202. The AP 204 along with the STAs 206 associated with the AP 204 and that use the AP 204 for communication may be referred to as a basic service set (BSS).

The AP 204 and each STA 206 may exchange data units that can include control information and/or data. At the physical (PHY) layer, such a data unit (e.g., a protocol data unit (PDU)) may be referred to as a physical layer protocol data unit (PPDU). In some aspects, a PPDU may be referred to as a packet or physical layer packet. Each PPDU may include a preamble and a payload. The preamble may include at least one training field (e.g., used for synchronization) and at least one signaling (SIG) field (e.g., used for control signaling). The payload may include a medium access control (MAC) header or data for other layers, and/or user data, for example. The payload may be transmitted using one or more data symbols. The systems, methods, and devices herein may utilize data units with training fields whose peak-to-power ratio has been minimized.

The wireless communication system 200 may employ methods to allow efficient access of the wireless communication medium based on unpredictable data transmissions while avoiding collisions. For example, to gain access to a channel, a device in the wireless communication system 200 may support a medium access control (MAC) distributed coordination function (DCF) that employs a carrier sense multiple access/collision avoidance (CSMA/CA) procedure. Other types of access schemes may be used in other examples. More generally, a device (e.g., an AP or a STA) having data for transmission senses the wireless communication medium to determine if the channel is already occupied. If the device senses the channel is idle, the device may transmit its data. Otherwise, the device may defer for some period before determining again whether or not the wireless communication medium is free for transmission. A method for performing a CSMA/CA procedure may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than a transmission that must wait longer before attempting to access the channel.

Some wireless communication systems (e.g., based on IEEE 802.11ax) employ a target wait time (TWT) mechanism that schedules STAs to transmit or receive on a wireless communication medium at certain times. This allows a STA to switch to a low power mode when the STA is not actively transmitting or receiving information. Thus, the STA may save power (outside of its scheduled transmit or receive times). In addition, the use of TWT scheduling may enable the BSS (e.g., an AP) to manage traffic more efficiently (e.g., by preventing communication collisions between STAs, by prioritizing traffic, and so on).

In some examples (e.g., if one or more of the STAs 206e and 206f are out of the range of the AP 204 or otherwise have difficulty communicating with the AP 204), a STA 206d may be configured as a relay device. For example, the STA 206d may be configured (e.g., with STA and AP functionality) to relay communication between the AP 204 and the STA 206e and to relay communication between the AP 204 and the STA 206f.

In some implementations, a wireless communication network might not have a central AP 204, but rather may function as a peer-to-peer network between the STAs 206. Accordingly, the functions of the AP 204 described herein may be performed by one or more of the STAs 206 in some examples. Also, in some examples, a STA may connect to a network served by an AP and also establish a peer-to-peer network with another STA.

For example, the STA 206b may communicate with the STA 206c via signaling 214 to form a peer-to-peer network. In this case, the STAs 206b and 206c may be referred to as a peer STAs. In some examples, the communication between the STAs 206b and 206c may operate pursuant to a wireless communication standard (e.g., the IEEE 802.11 standard or some other standard). For example, a first peer STA that has data to transmit to a second peer STA may perform a CSMA/CA procedure to gain access to a channel. In addition, the peer STAs may transmit data units that conform to the 802.11 standard (e.g., the data units include headers and payloads that conform to a specific version of the standard).

Access points in a network may communicate with one or more network entities (represented, for convenience, by network entities 212 in FIG. 2), including each other, to facilitate wide area network connectivity. A network entity may take various forms such as, for example, one or more radio and/or core network entities. Thus, in various implementations the network entities 212 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

Figure 3:
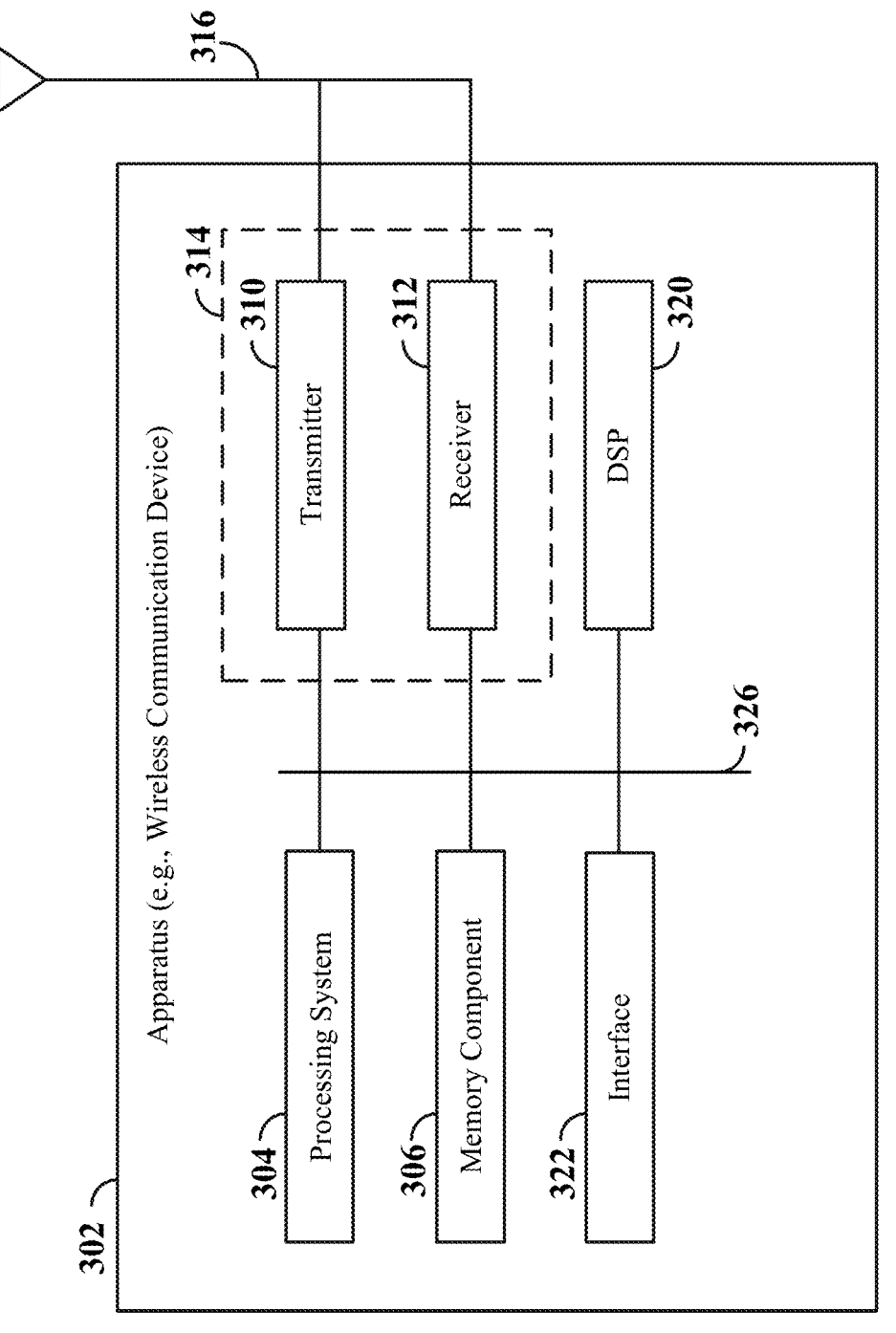
FIG. 3 is a block diagram of an example of an apparatus (e.g., a wireless communication device) according to some aspects.

FIG. 3 illustrates several components of an apparatus (e.g., a wireless node) 302 that may be deployed within the wireless communication system 200. The apparatus 302 is an example of a device that may be configured to implement the various methods described herein. For example, the apparatus 302 may be implemented as the AP 204, a relay (e.g., the STA 206d), or one of the other STAs 206 of FIG. 2. In some examples, the apparatus 302 may correspond to any of the apparatuses, APs, ATs, STAs, transmitting devices, or receiving devices shown in any of FIGS. 1, 2, 6, 7, 16, and 19.

The apparatus 302 may include a processing system 304 that controls operation of the apparatus 302. The processing system 304 may also be referred to as a central processing unit (CPU). A memory component 306 (e.g., including at least one memory device), which may include both read-only memory (ROM) and random access memory (RAM), provides instructions and data to the processing system 304. A portion of the memory component 306 may also include non-volatile random access memory (NVRAM). The processing system 304 typically performs logical and arithmetic operations based on program instructions stored within the memory component 306. The instructions in the memory component 306 may be executable to implement the methods described herein. In some aspects, the processing system 304 and the memory component 306 of FIG. 6 may correspond to the processing system 1614 of FIG. 16. In some aspects, the processing system 304 and the memory component 306 of FIG. 6 may correspond to the processing system 1914 of FIG. 19.

When the apparatus 302 is implemented or used as a transmitting node, the processing system 304 may be configured to select one of a plurality of medium access control (MAC) header types, and to generate a packet having that MAC header type. For example, the processing system 304 may be configured to generate a packet including a MAC header and a payload and to determine what type of MAC header to use.

When the apparatus 302 is implemented or used as a receiving node, the processing system 304 may be configured to process packets of a plurality of different MAC header types. For example, the processing system 304 may be configured to determine the type of MAC header used in a packet and process the packet and/or fields of the MAC header.

The processing system 304 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 304 to perform the various functions described herein.

The apparatus 302 may also include a housing that may include a transmitter 310 and a receiver 312 to allow transmission and reception of data between the apparatus 302 and a remote location. The transmitter 310 and receiver 312 may be combined into single communication device (e.g., a transceiver 314). In some implementations (e.g., where the transceiver 314 is an RF transceiver), an antenna 316 may be attached to the housing and electrically coupled to the transceiver 314. The apparatus 302 may also include (not shown) multiple transmitters, multiple receivers, multiple transceivers, and/or multiple antennas. The transmitter 310 and the receiver 312 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 310 may be configured to wirelessly transmit packets according to one or more MAC header types (e.g., corresponding to different versions of the 802.11 standard). For example, the transmitter 310 may be configured to transmit packets with the type of header generated by the processing system 304, discussed above.

The receiver 312 may be configured to wirelessly receive packets having one or more MAC header types. In some aspects, the receiver 312 is configured to detect a particular type of a MAC header and process the packet accordingly.

The receiver 312 may be used to detect and quantify the level of signals received by the transceiver 314. The receiver 312 may detect such signals as total energy, energy per subcarrier per symbol, power spectral density, or in some other manner. The apparatus 302 may also include a digital signal processor (DSP) 320 for use in processing signals. In some examples, the DSP 320 may be configured to generate a data unit for transmission. In some aspects, the data unit may include (e.g., may be) a physical layer data unit (PPDU). In some aspects, a PPDU may be referred to as a packet.

The apparatus 302 may further include an interface 322. In examples where the interface 322 is a user interface, the interface 322 may include (e.g., may be) a keypad, a microphone, a speaker, a display, and/or the like. Such a user interface may include any element or component that conveys information to a user of the apparatus 302 and/or receives input from the user.

The various components of the apparatus 302 may be coupled together by a bus system 326. The bus system 326 may include a data bus, for example, as well as a power bus, a control signal bus, and a status signal bus in addition to the data bus. Those of skill in the art will appreciate the components of the apparatus 302 may be coupled together or accept or provide inputs to each other using some other mechanism.

In some examples, the apparatus 302 may be an integrated circuit. In some examples, the apparatus 302 may be configured to operate in a wireless node (e.g., an AP or a STA) and to perform one or more of the operations described herein.

In some implementations, the apparatus 302 communicates with at least one other apparatus (not shown) via the interface 322. To this end, in some implementations, the interface 322 (e.g., a send/receive interface) may be coupled to the processing system 304 for outputting and/or obtaining (e.g., sending and/or receiving) information (e.g., received information, generated information, decoded information, messages, etc.) between the processing system 304 and the other apparatus. In some implementations, the interface 322 may include an interface bus, bus drivers, bus receivers, other suitable circuitry, or a combination thereof. In some implementations, the interface 322 may include radio frequency (RF) circuitry (e.g., an RF transmitter and/or an RF receiver).

Thus, the apparatus 302 may communicate with other apparatuses in various ways. In some examples, the apparatus may transmit and receive information (e.g., a frame, a message, bits, etc.) via RF signaling. In some cases, rather than transmitting information via RF signaling, the apparatus 302 may use the interface 322 to provide (e.g., output, send, transmit, etc.) information for RF transmission. For example, the processing system 304 may output information, via a bus interface, to an RF front end for RF transmission. Similarly, rather than receiving information via RF signaling, the apparatus 302 may use the interface 322 to obtain information that is received by another apparatus. For example, the processing system 304 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Although a number of separate components are illustrated in FIG. 3, one or more of the components may be combined or commonly implemented. For example, the processing system 304 may be used to implement not only the functionality described above with respect to the processing system 304, but also to implement the functionality described above with respect to the transceiver 314 and/or the DSP 320. Each of the components illustrated in FIG. 3 may be implemented using a plurality of separate elements. Furthermore, the processing system 304 may be used to implement any of the components, modules, circuits, or the like described below, or each may be implemented using a plurality of separate elements.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 3 may be implemented by processor and memory component(s) of the apparatus (e.g., by execution of appropriate code and/or by appropriate configuration of processor components). It should be appreciated that these components may be implemented in different types of apparatuses in different implementations (e.g., in an application-specific integrated circuit (ASIC), in a system-on-a-chip (SoC), etc.).

A device (e.g., the apparatus 302) operating in the wireless communication system 200 may implement only functionality of a transmitting node, only functionality of a receiving node, or functionality of both a transmitting node and a receive node. For ease of reference, when discussing the apparatus 302 operating as a transmitting node, it may be hereinafter referred to as an apparatus 302t. Similarly, when discussing the apparatus 302 operating as a receiving node, it may be hereinafter referred to as an apparatus 302r.

Figure 4:
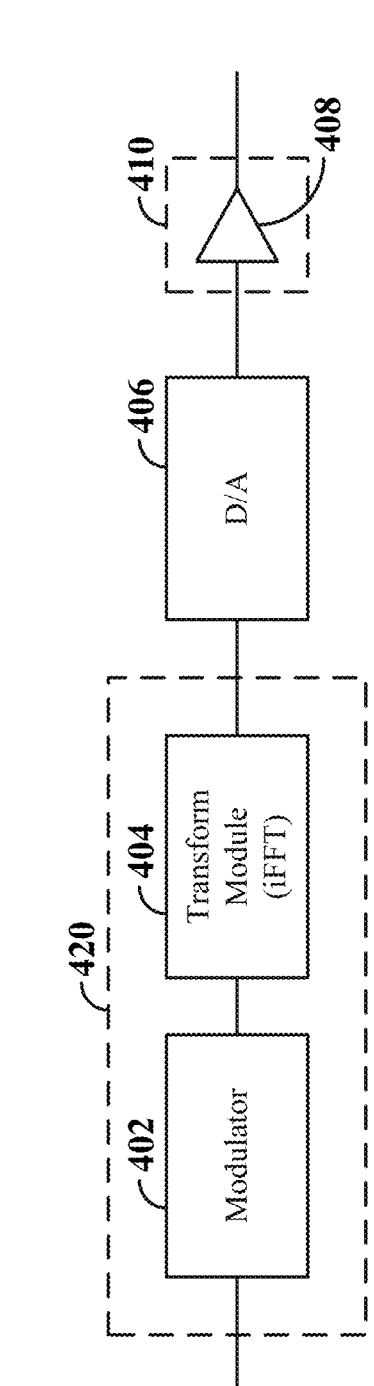
FIG. 4 is a block diagram of example components of the apparatus of FIG. 3 that may be used to transmit wireless communication signals according to some aspects.

FIG. 4 illustrates various components that may be utilized in the apparatus 302t to transmit wireless communication. The components illustrated in FIG. 4 may be used, for example, to transmit OFDM communication. In some examples, the components illustrated in FIG. 4 are used to generate and transmit packets to be sent over a bandwidth of less than or equal to 1 MHz. In some examples, the components illustrated in FIG. 4 are used to generate and transmit packets to be sent over a bandwidth of greater than or equal to 1 MHz.

The apparatus 302t of FIG. 4 may include a modulator 402 configured to modulate bits for transmission. For example, the modulator 402 may determine a plurality of symbols from bits received from the processing system 304 (FIG. 3) or the interface 322 (FIG. 3), for example by mapping bits to a plurality of symbols according to a constellation. The bits may correspond to user data or to control information. In some aspects, the bits are received in codewords. In one example, the modulator 402 may include (e.g., may be) a QAM (quadrature amplitude modulation) modulator, for example, a 16-QAM modulator or a 64-QAM modulator. In other examples, the modulator 402 may include (e.g., may be) a binary phase-shift keying (BPSK) modulator, a quadrature phase-shift keying (QPSK) modulator, or an 8-PSK modulator. Other types of modulators may be used in other examples.

The apparatus 302t may further include a transform module 404 configured to convert symbols or otherwise modulated bits from the modulator 402 into a time domain. In FIG. 4, the transform module 404 is illustrated as being implemented by an inverse fast Fourier transform (IFFT) module. Other types of transform modules may be used in other examples. In some implementations, there may be multiple transform modules (not shown) that transform units of data of different sizes. In some implementations, the transform module 404 may be itself configured to transform units of data of different sizes. For example, the transform module 404 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 24 points are used to convert symbols being transmitted over 24 tones into a time domain. The number of points used by the transform module 404 may be referred to as the size of the transform module 404.

In FIG. 4, the modulator 402 and the transform module 404 are illustrated as being implemented in a DSP 420. In some examples, however, one or both of the modulator 402 and the transform module 404 may be implemented in the processing system 304 of FIG. 3 or in another element of the apparatus 302t.

As discussed above, the DSP 420 may be configured to generate a data unit for transmission. In some aspects, the modulator 402 and the transform module 404 may be configured to generate a data unit including a plurality of fields including control information and a plurality of data symbols.

The apparatus 302*t* may further include a digital to analog converter (D/A) 406 configured to convert the output of the transform module into an analog signal. For example, the time-domain output of the transform module 404 may be converted to a baseband OFDM signal by the digital to analog converter 406. The digital to analog converter 406 may be implemented in the processing system 304 or in another element of the apparatus 302 of FIG. 3. In some aspects, the digital to analog converter 406 is implemented in the transceiver 314 of FIG. 3 or in a data transmit processor.

The analog signal may be wirelessly transmitted by a transmitter 410. The analog signal may be further processed before being transmitted by the transmitter 410, for example by being filtered or by being upconverted to an intermediate or carrier frequency. In the example illustrated in FIG. 4, the transmitter 410 includes a transmit amplifier 408. Prior to being transmitted, the analog signal may be amplified by the transmit amplifier 408. In some examples, the amplifier 408 may include a low noise amplifier (LNA).

The transmitter 410 is configured to transmit one or more packets or data units in a wireless signal based on the analog input signal. The data units may be generated using the processing system 304 of FIG. 3 and/or the DSP 420, for example using the modulator 402 and the transform module 404 as discussed above. Data units that may be generated and transmitted as discussed above are described in additional detail herein.

Figure 5:
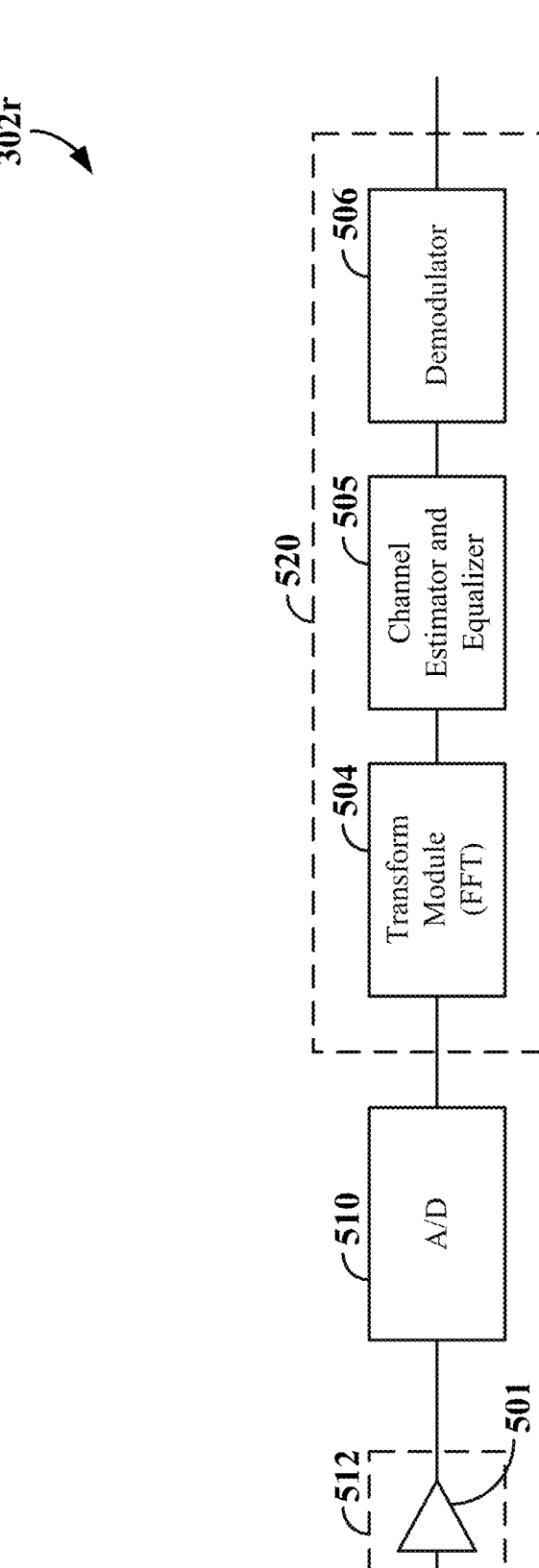
FIG. 5 is a block diagram of example components of the apparatus of FIG. 3 that may be used to receive wireless communication signals according to some aspects.

FIG. 5 illustrates various components that may be utilized in the apparatus 302*r* to receive wireless communication. The components illustrated in FIG. 5 may be used, for example, to receive OFDM communication. For example, the components illustrated in FIG. 5 may be used to receive data units transmitted by the components such as those discussed above with respect to FIG. 4.

A receiver 512 of apparatus 302*r* is configured to receive one or more packets or data units in a wireless signal. These data units may be received and decoded or otherwise processed as discussed below.

In the example illustrated in FIG. 5, the receiver 512 includes a receive amplifier 501. The receive amplifier 501 may be configured to amplify the wireless signal received by the receiver 512. In some examples, the receiver 512 is configured to adjust the gain of the receive amplifier 501 using an automatic gain control (AGC) function. In some aspects, the automatic gain control uses information in one or more training fields of a received data unit, such as a short training field (STF) for example, to adjust the gain. Those having ordinary skill in the art will understand methods for performing AGC. In some aspects, the amplifier 501 may include an LNA.

The apparatus 302*r* includes an analog to digital converter (A/D) 510 configured to convert the amplified wireless signal from the receiver 512 into a digital representation thereof. Further to being amplified, the wireless signal may be processed (e.g., by the receiver 512) before being converted by the analog to digital converter 510, for example by being filtered or by being downconverted to an intermediate or baseband frequency. The analog to digital converter 510 may be implemented in the processing system 304 of FIG. 3 or in another element of the apparatus 302*r*. In some examples, the analog to digital converter 510 is implemented in the transceiver 314 of FIG. 3 or in a data receive processor.

The apparatus 302*r* may further include a transform module 504 configured to convert the representation of the wireless signal into a frequency spectrum. In FIG. 5, the transform module 504 is illustrated as being implemented by a fast Fourier transform (FFT) module. In some aspects, the transform module 504 may identify a symbol for each point that it uses. As described above with reference to FIG. 4, the transform module 504 may be configured with a plurality of modes, and may use a different number of points to convert the signal in each mode. The number of points used by the transform module 504 may be referred to as the size of the transform module 504. In some aspects, the transform module 504 may identify a symbol for each point that it uses. Other types of transform modules may be used in other examples.

The apparatus 302*r* may further include a channel estimator and equalizer 505 configured to form an estimate of the channel over which the data unit is received, and to remove certain effects of the channel based on the channel estimate. For example, the channel estimator and equalizer 505 may be configured to approximate a function of the channel, and the channel equalizer may be configured to apply an inverse of that function to the data in the frequency spectrum.

The apparatus 302*r* may further include a demodulator 506 configured to demodulate the equalized data. For example, the demodulator 506 may determine a plurality of bits from symbols output by the transform module 504 and the channel estimator and equalizer 505, for example by reversing a mapping of bits to a symbol in a constellation. The bits may be processed or evaluated by the processing system 304 of FIG. 3, or used to display or otherwise output information to the interface 322 of FIG. 3. In this way, data and/or information may be decoded. In some aspects, the bits correspond to codewords. In one example, the demodulator 506 may include a quadrature amplitude modulation (QAM) demodulator, for example an 8-QAM demodulator or a 64-QAM demodulator. In other aspects, the demodulator 506 may include a binary phase-shift keying (BPSK) demodulator or a quadrature phase-shift keying (QPSK) demodulator. Other types of demodulators may be used in other examples.

In FIG. 5, the transform module 504, the channel estimator and equalizer 505, and the demodulator 506 are illustrated as being implemented in the DSP 520. In some examples, however, one or more of the transform module 504, the channel estimator and equalizer 505, and the demodulator 506 may be implemented in the processing system 304 of FIG. 3 or in another element of the apparatus 302 of FIG. 3.

As discussed above, the wireless signal received at the receiver 312 may include one or more data units. Using the functions or components described above, the data units or data symbols therein may be decoded evaluated or otherwise evaluated or processed. For example, the processing system 304 of FIG. 3 and/or the DSP 520 may be used to decode data symbols in the data units using the transform module 504, the channel estimator and equalizer 505, and the demodulator 506.

The apparatus 302*t* shown in FIG. 4 is an example of a single transmit chain used for transmitting via an antenna. The apparatus 302*r* shown in FIG. 5 is an example of a single receive chain used for receiving via an antenna. In some implementations, the apparatus 302*t* or 302*r* may implement a portion of a multiple-input multiple-output (MIMO) system that uses multiple antennas to simultaneously transmit data via multiple streams and/or receive simultaneously transmit data via multiple streams.

Figure 6:
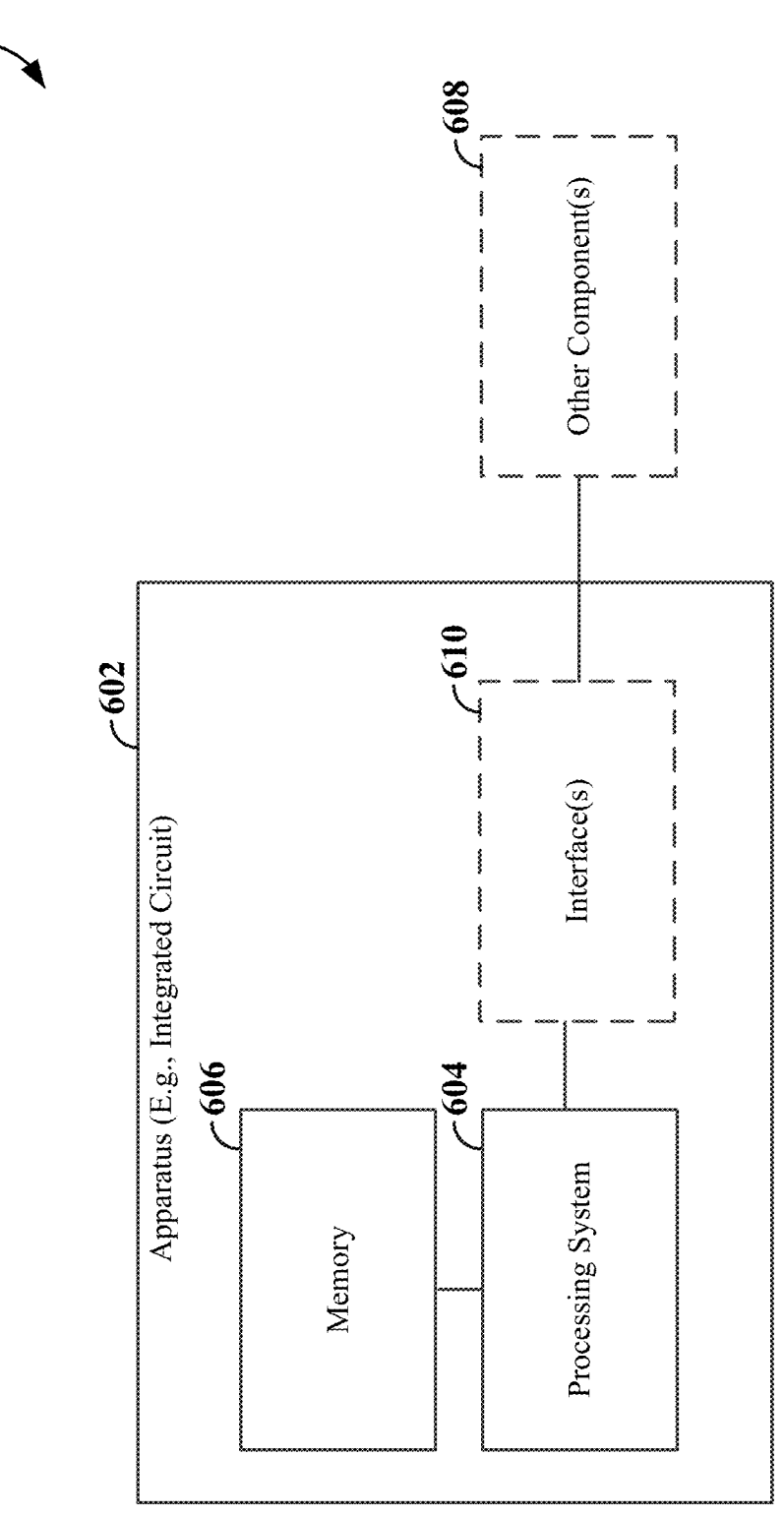
FIG. 6 is a block diagram of an example of an apparatus (e.g., an integrated circuit) according to some aspects.

FIG. 6 illustrates an example apparatus 600 according to certain aspects of the disclosure. In some examples, the apparatus 600 may be an AP, an AT, or some other type of wireless node (e.g., a node that utilizes wireless spectrum (e.g., the RF spectrum) to communicate with another node or entity). In some examples, the apparatus 600 may correspond to any of the apparatuses, APs, ATs, STAs, transmitting devices, or receiving devices shown in any of FIGS. 1, 2, 3, 7, 16, and 19.

The apparatus 600 includes an apparatus 602 (e.g., an integrated circuit) and, optionally, at least one other component 608. In some examples, the apparatus 602 may be configured to operate in a wireless node (e.g., an AP, AT, a STA, etc.) and to perform one or more of the operations described herein. The apparatus 602 includes a processing system 604, and a memory 606 coupled to the processing system 604. Example implementations of the processing system 604 are provided herein. In some aspects, the processing system 604 and the memory 606 of FIG. 6 may correspond to the processing system 1614 of FIG. 16. In some aspects, the processing system 604 and the memory 606 of FIG. 6 may correspond to the processing system 1914 of FIG. 19.

The processing system 604 is generally adapted for processing, including the execution of such programming stored on the memory 606. For example, the memory 606 may store instructions that, when executed by the processing system 604, cause the processing system 604 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 602 communicates with at least one other component (e.g., a component 608 external to the apparatus 602) of the apparatus 600. To this end, in some implementations, the apparatus 602 may include at least one interface 610 (e.g., a send and/or receive interface) coupled to the processing system 604 for outputting and/or obtaining (e.g., sending and/or receiving) information (e.g., received information, generated information, decoded information, messages, etc.) between the processing system 604 and the other component(s) 608. In some implementations, the interface 610 may include an interface bus, bus drivers, bus receivers, buffers, other suitable circuitry, or a combination thereof. In some implementations, the interface 610 may include radio frequency (RF) circuitry (e.g., an RF transmitter and/or an RF receiver). In some implementations, the interface 610 may be configured to interface the apparatus 602 to one or more other components of the apparatus 600 (other components not shown in FIG. 6). For example, the interface 610 may be configured to interface the processing system 604 to a radio frequency (RF) front end (e.g., an RF transmitter and/or an RF receiver).

The apparatus 602 may communicate with other apparatuses in various ways. In cases where the apparatus 602 includes an RF transceiver (not shown in FIG. 6), the apparatus may transmit and receive information (e.g., a frame, a message, bits, etc.) via RF signaling. In some cases, rather than transmitting information via RF signaling, the apparatus 602 may have an interface to provide (e.g., output, send, transmit, etc.) information for RF transmission. For example, the processing system 604 may output information, via a bus interface of the processing system 604, to an RF front end for RF transmission. Similarly, rather than receiving information via RF signaling, the apparatus 602 may have an interface to obtain information that is received by another apparatus. For example, the processing system 604 may obtain (e.g., receive) information, via a bus interface of the processing system 604, from an RF receiver that received the information via RF signaling. In some implementations, an interface may include multiple interfaces. For example, a bidirectional interface may include a first interface for obtaining and a second interface for outputting.

Figure 7:
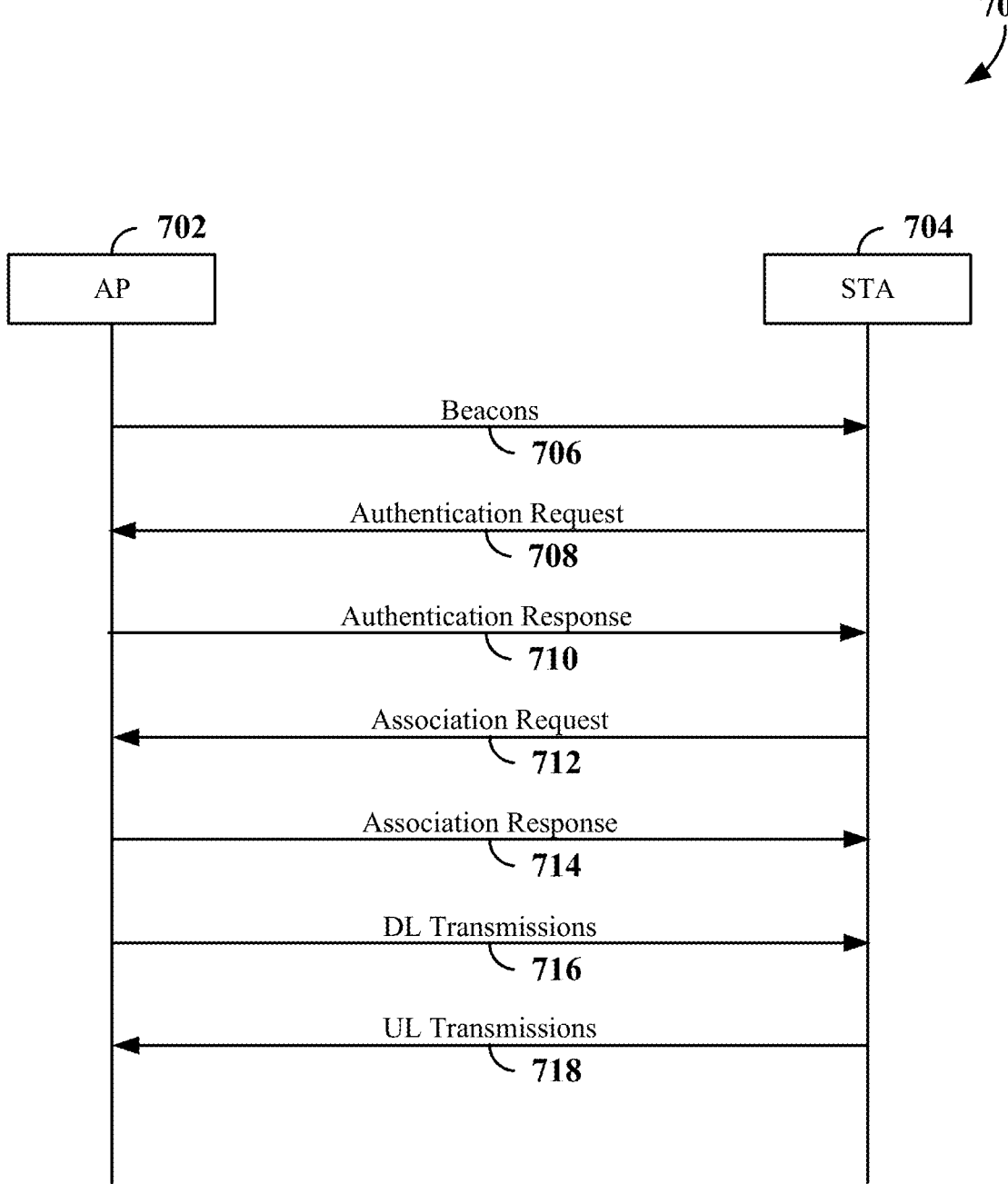
FIG. 7 is a signaling diagram illustrating an example of signaling between an access point and a station according to some aspects.

In an IEEE 802.11-based network, a STA can gain network access via an authentication and association procedure. FIG. 7 illustrates an example of authentication/association signaling in a wireless communication system 700 including an access point (AP) 702 and a station (STA) 704. In some examples, the AP 702 may correspond to any of the APs or other apparatuses described in any one or more of FIGS. 1, 2, 3, 6, 7, 16, and 19. In some examples, the STA 704 may correspond to any of the STAs or other apparatuses described in any one or more of FIGS. 1, 2, 3, 6, 7, 16, and 19.

At #706 of FIG. 7, the AP 702 transmits management frames including beacons on designated RF bands. In some examples, these so-called beacon frames may be transmitted at intervals referred to as target beacon transmission times (TBTTs). In some examples, a beacon frame may include information such as the service set identifiers (SSIDs), basic SSIDs (BSSIDs), security capability, TBTT, RF channels (bands), traffic indication map (TIM), delivery TIM (DTIM), and connection speeds supported or used by the AP 702.

In some examples, a beacon frame may include timing information relating to a timing synchronization (TSF). An AP may use a TSF to maintain timing synchronization between the AP and any STAs that are communicating with the AP. For example, the AP and each STA may operate a timer (e.g., that increments every microsecond). In addition, the AP may repeatedly (e.g., periodically) broadcast TSF information (e.g., a TSF value) that enables the timers of the STAs to maintain synchronization with the timer of the AP.

Upon receiving a beacon from the AP 702, the STA 704 may attempt to access to a basis service set (BSS) of the AP 702. Thus, at #708, the STA 704 sends a management frame including an authentication request to the AP 702 on one of the RF channels supported by the AP 702. In some examples, this authentication request includes an identifier of the STA 704 (e.g., a MAC address).

At #710, the AP 702 responds to the authentication request by sending a management frame including an authentication response to the STA 704. In some examples, this authentication response indicates the success or failure of the authentication (e.g., whether the STA 704 has the capability to access the BSS).

If the STA 704 is authenticated at #710, at #712 the STA 704 sends a management frame including an association request to the AP 702 to establish an association with the BSS. In some examples, the association request may include one or more capabilities of the STA 704.

At #714, the AP 702 responds to the association request by sending a management frame including an association response to the STA 704. In some examples, this association response includes an association identifier (AID) that the AP 702 assigns to the STA 704.

Once the STA 704 successfully completes the authentication and association operations, the AP 702 and the STA 704 may commence communicating user traffic. For example, at #716, the AP 702 may transmit downlink (DL) transmissions including various frames (e.g., management frames, control frames, data frames, etc.) to the STA 704 on one or more of the RF channels supported by the AP 702. Similarly, at #718, the STA 704 may transmit uplink (UL) transmissions including various frames (e.g., management frames, control frames, data frames, etc.) to the AP 702 on one or more of the RF channels supported by the AP 702.

As mentioned above, an apparatus such as the AP 702 and the STA 704 may communicate information using a data unit. A data unit may take different forms in different implementations. In some examples, a data unit may be a frame for wireless communication. In some examples, a data unit may be a Physical Layer Convergence Protocol (PLCP) Protocol Data Unit (PPDU) for Wi-Fi communication. In some examples, a data unit may be an IEEE 802.11 frame (e.g., an IEEE 802.11ac frame, an IEEE 802.11ax frame, etc.). Other examples of data units for wireless communication are possible.

Figure 8:
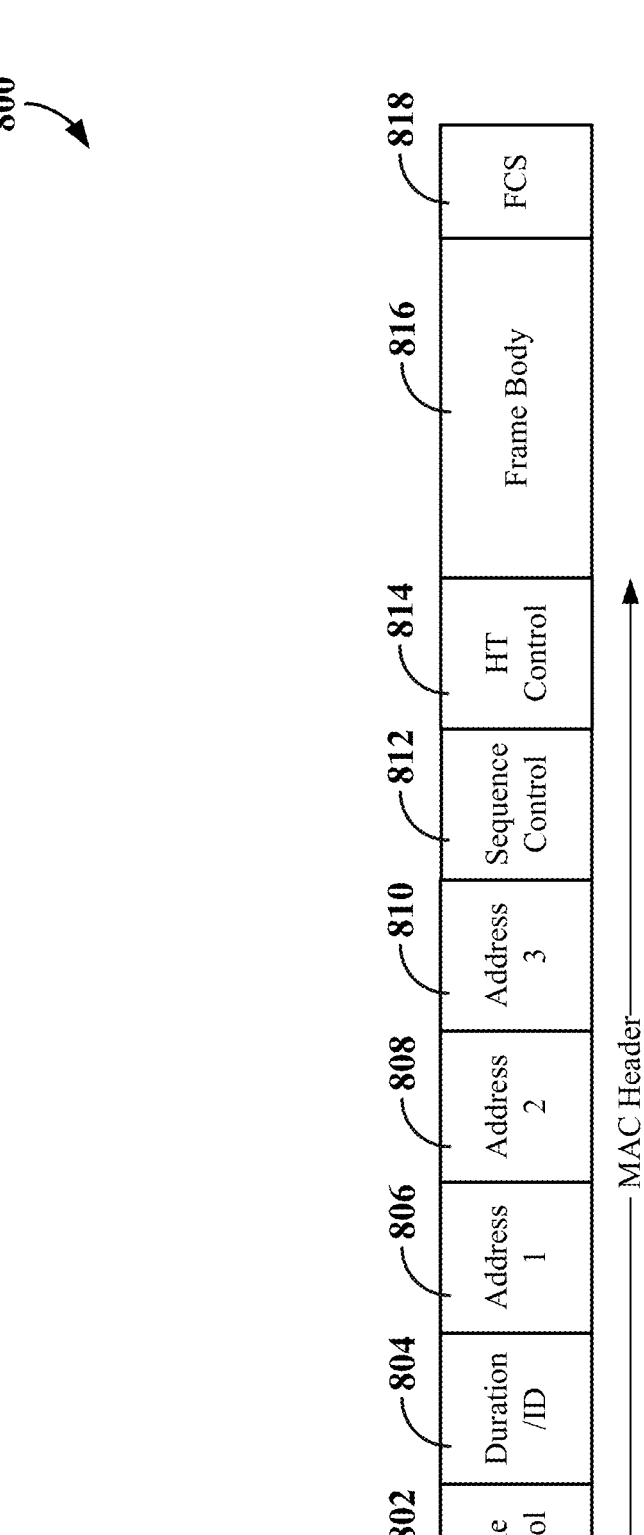
FIG. 8 is a conceptual illustration of an example of a frame format according to some aspects.

FIG. 8 illustrates an example of a MAC frame 800 that may be send via a PPDU. In some examples, the MAC frame 800 may be a management frame (e.g., a frame that is used to manage a basic service set). In some examples, a management frame may be an action frame (e.g., a frame that triggers an action).

The MAC frame 800 includes a frame control field 802, a duration/ID field 804, a first address field 806, a second address field 808, a third address field 810, a sequence control field 812, a high throughput (HT) control field 814, a frame body field 816 (e.g., for a data payload), and a frame check sequence (FCS) field 818. Other types of MAC frames and/or other types of fields may be used in other examples.

In some examples, the frame control field 802 carries an indication of the associated frame type. For example, this indication may specify whether the frame is a management frame, a control frame, or a data frame.

In some examples, the duration/ID field 804 carries the AID of the associated STA. For example, for a frame sent by a STA, the AID may be the AID of that STA. Similarly, for a frame sent to a STA, the AID may be the AID of that STA.

In some examples, the address fields include MAC addresses corresponding to a source address (SA), a destination address (DA), a transmitting STA address (TA), and a receiving STA address (RA) for the frame. Here, the STA for the TA and the RA may refer to an AP STA or a non-AP STA.

In some examples, the sequence control field 812 carries a sequence number (SN). The SN may be incremented with every subsequent frame transmission in a given session. Thus, the SN may be used, for example, to reorder a sequence of frames (e.g., one frame has sequence number 1, the next frame has sequence number 2, and so on) that may have been received out of order.

In some examples, an IEEE 802.11-based network may communicate using multiple radio links. For convenience, a radio link may be referred to simply as a link herein, and communication on multiple links may be referred to as multi-link communication. In multi-link communication, a multi-link device (MLD) may manage multiple STAs, where each of the STAs operate on one of a set of radios links supported by the MLD. In some examples, frame exchanges may occur between STAs, and management and upper layer MAC functionality may be performed by the MLDs. In some examples, the STAs may send data and/or management frames on behalf of an MLD to other STAs associated with another MLD.

In some examples, an MLD includes multiple APs to support different links. For example, an MLD may include a first AP operating in a first band (e.g., a 2.4 GHz band), serving a first link, a second AP operating in a second band (e.g., a 5 GHz band), serving a second link, and so on. In this case, the MLD may support inter-AP communication (e.g., management signaling) to manage the different links.

The disclosure relates in some aspects to multi-link management signaling. Currently, IEEE 802.11-based networks may use a target wait time (TWT) element that contains a link ID bitmap or a Multi-Link Link information element (IE) for multi-link management signaling. A TWT element may be exchanged (e.g., from a STA to any APs that are operating on the same link) to indicate when the STA is intending to wake up and to indicate how long the STA intends to remain awake.

Figure 9:
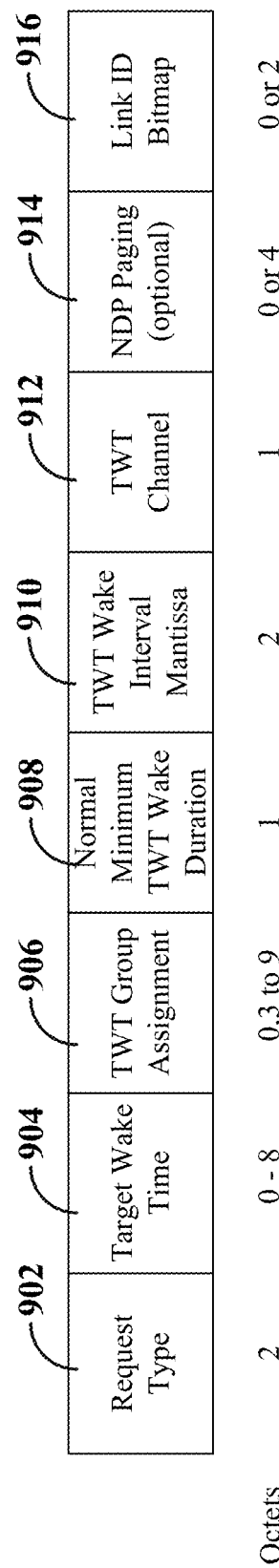
FIG. 9 is a conceptual illustration of an example of a target wake time (TWT) element according to some aspects.

FIG. 9 illustrates, for an example of a TWT element 900, the field format for the individual TWT parameter set. The TWT element 900 includes a request type field 902, a TWT field 904, a TWT group assignment field 906, a nominal minimum TWT wake duration field 908, a TWT wake interval mantissa field 910, a TWT channel field 912, a null data packet (NDP) paging field 914, and a Link ID Bitmap field 916. Other types of TWT elements and/or other types of fields may be used in other examples.

The Link ID Bitmap field 916 is present if a Link ID Bitmap Present bit (not shown) in the TWT element 900 is equal to a value of 1. Otherwise, the Link ID Bitmap field 916 is not present in the TWT element 900. The Link ID Bitmap field 916 indicates the links to which the TWT element sent by a STA affiliated with an MLD applies. A value of 1 in bit position i of the Link ID Bitmap field 916 means that the link to which the TWT element sent by a STA affiliated with an MLD applies. A value of 0 in bit position i of the Link ID Bitmap field 916 means that the link associated with the link ID i is not the link to which the TWT element sent by a STA affiliated with an MLD applies.

Thus, a first STA may send a TWT request including the TWT element 900 to a first AP to inform the first AP of the first STA's schedule. In addition, the TWT element 900 may indicate that this schedule applies to other STAs from the same MLD that the first STA is associated with (e.g., based on TWT negotiation between the STAs). For example, the Link ID Bitmap field 916 may indicate to which links (and, hence, to which other STAs) the schedule applies. Upon receiving the TWT element 900, the first AP make forward the TWT element 900 to a second AP (e.g., of the same MLD). The second AP may then confirm or reject the proposed TWT, whereby the first AP may send a corresponding response to its STAs (e.g., the first STA, etc.).

The use of the TWT element 900 may have some limitations. For example, the TWT element 900 is designed to carry a single set of parameters. Thus, to provide different sets of parameters, multiple TWT elements need to be sent. In some examples, a single frame may carry multiple TWT elements. However, a TWT is defined relative to the timing synchronization function (TSF) timer of an AP. Thus, to avoid ambiguity, multiple TWT elements in the same frame should correspond to APs that use the same TSF timer (or are otherwise synchronized).

Figure 10:
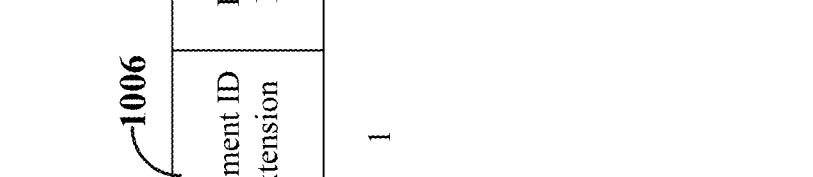
FIG. 10 is a conceptual illustration of an example of a multi-link link information element according to some aspects.

FIG. 10 illustrates an example of a Multi-Link Link IE 1000 that may be included in a frame and applied to other information carried by the frame. The Multi-Link Link IE 1000 includes an element ID field 1002, a length field 1004, an element ID extension field 1006, and a Link ID Bitmap field 1008. Other types of Multi-Link elements and/or other types of fields may be used in other examples.

The Link ID Bitmap field 1008 indicates the link(s) that the intended STA(s) are operating on and to which the multi-link information carried in the same frame applies. Between an AP MLD and a non-AP MLD associated with the AP MLD, an individually addressed management MAC PDU (MMPDU) that is not a TWT Setup frame that includes a Link ID Bitmap subfield in an element and that is intended for one or more STA(s) affiliated with the associated MLD with setup link(s) may be used with the procedure that follows. If the individually addressed MMPDU is transmitted to another STA (other than the intended STA(s)) affiliated with the associated MLD with a setup link, then the individually addressed MMPDU shall include a Multi-Link Link Information element that identifies the intended link(s) of the MMPDU as the last element but before the Vendor Specific element(s) (if present). Otherwise, the individually addressed MMPDU may include a Multi-Link Link Information element that identifies the intended link(s) of the MMPDU as the last element but before the Vendor Specific element(s).

In some examples, between an AP MLD and a non-AP MLD associated with the AP MLD, a TWT Setup frame that includes a Link ID Bitmap subfield in its TWT element does not include a Multi-Link Link Information element. In some examples, between an AP MLD and a non-AP MLD associated with the AP MLD, an individually addressed MMPDU that is intended for an associated MLD does not include a Multi-Link Link Information element. In some examples, between an AP MLD and a non-AP MLD associated with the AP MLD, if an individually addressed MMPDU that carries a Multi-Link Link Information element is received by a STA affiliated with the MLD, then the MLD will discard the MMPDU if the Multi-Link Link Information indicates any link that has not been setup.

The use of the Multi-Link Link IE 1000 may have some limitations. For example, only a single Multi-Link Link IE 1000 is included in a frame. Thus, the single Multi-Link Link IE 1000 will apply to all information included in the frame.

The disclosure relates in some aspects to providing a unified way of signaling multi-link management information that is more flexible than the TWT element and Multi-Link Link IE techniques described above. In one example, a Multi-Link Link IE is defined to include information sub-elements. In another example, a frame may include multiple Multi-Link Link IEs. In yet another example, an aggregated MAC PDU (A-MPDU) may include one or more frames, where each frame includes one Multi-Link Link IE. In a further example, a Link Information variant of a Multi-Link element is defined. Through the use of these techniques, more flexible capabilities for signaling a variety of elements for a subset of links can be provided. Moreover, this signaling can be included in a single frame (or A-MPDU), thereby provide for simpler and more efficient delivery of management information.

Figure 11:
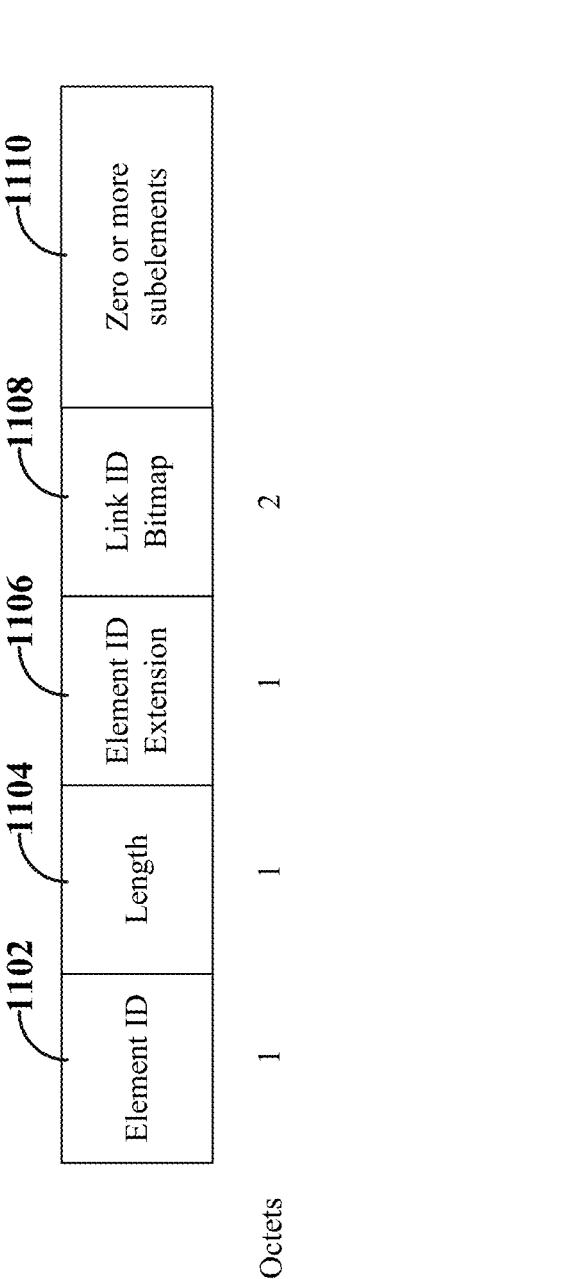
FIG. 11 is a conceptual illustration of another example of a multi-link link information element according to some aspects.

In addition to the examples mentioned above, in a first example of signaling multi-link management information, a control field may be defined to provide various types of information being delivered across the multiple links. For example, FIG. 11 illustrates an example of a Multi-Link (ML) Link IE 1100 that may be included in a frame. The ML Link IE 1100 includes an element ID field 1102, a length field 1104, an element ID extension field 1106, a Link ID Bitmap field 1108, and a sub-element field 1110. In this example a Control field may be optionally present after the Link ID Bitmap. Other types of ML elements and/or other types of fields may be used in other examples.

The sub-element field 1110 contains zero or more elements for which the included ML information applies to the links that are identified by a nonzero value in the Link ID Bitmap field 1108. A management (MGMT) frame (e.g., an action frame) may contain one or more of these ML Information elements, each of which contains a set of sub-elements, which apply to the links identified in the Link ID Bitmap field 1108. The originator of the management frame (e.g., a STA) ensures that there is no overlapping information across the ML Link IEs so that there is no conflicting information for the recipient.

In some examples, the sub-element field 1110 carries management information associated with one or more links. For example, the sub-element field 1110 may include a first sub-element that carries link recommendation information, a second sub-element that carries information regarding signaling priority, a third sub-element that includes TWT information, and so on. In this example all these elements apply to the links that are identified with a nonzero value in the Link ID Bitmap field.

The length field 1104 of the ML Link IE 1100 limits the size of the element itself to be a maximum of 252 octets in some examples (since 3 octets are used by the element ID extension field 1106 and the Link ID Bitmap field 1108). Thus, there is a limitation on the number of sub-elements that can be carried in the ML Link IE 1100. Any one or more of the following options may be used to address this issue.

A first option involves allowing more than one ML Link IE in a frame (e.g., an action frame), where each ML Link IE contains the same Link ID Bitmap setting. In this case, the ML Link Information elements contain nonoverlapping sets of elements.

A second option involves an inheritance model of the elements. In this case, the inheritance is from the elements list that is contained for the current link (e.g., a currently active link that is used by a UE for communication with a network entity).

A third option involves element fragmentation for the ML Link IE. In this case, a single ML Link IE may be followed by one or more fragment elements.

Figure 12:
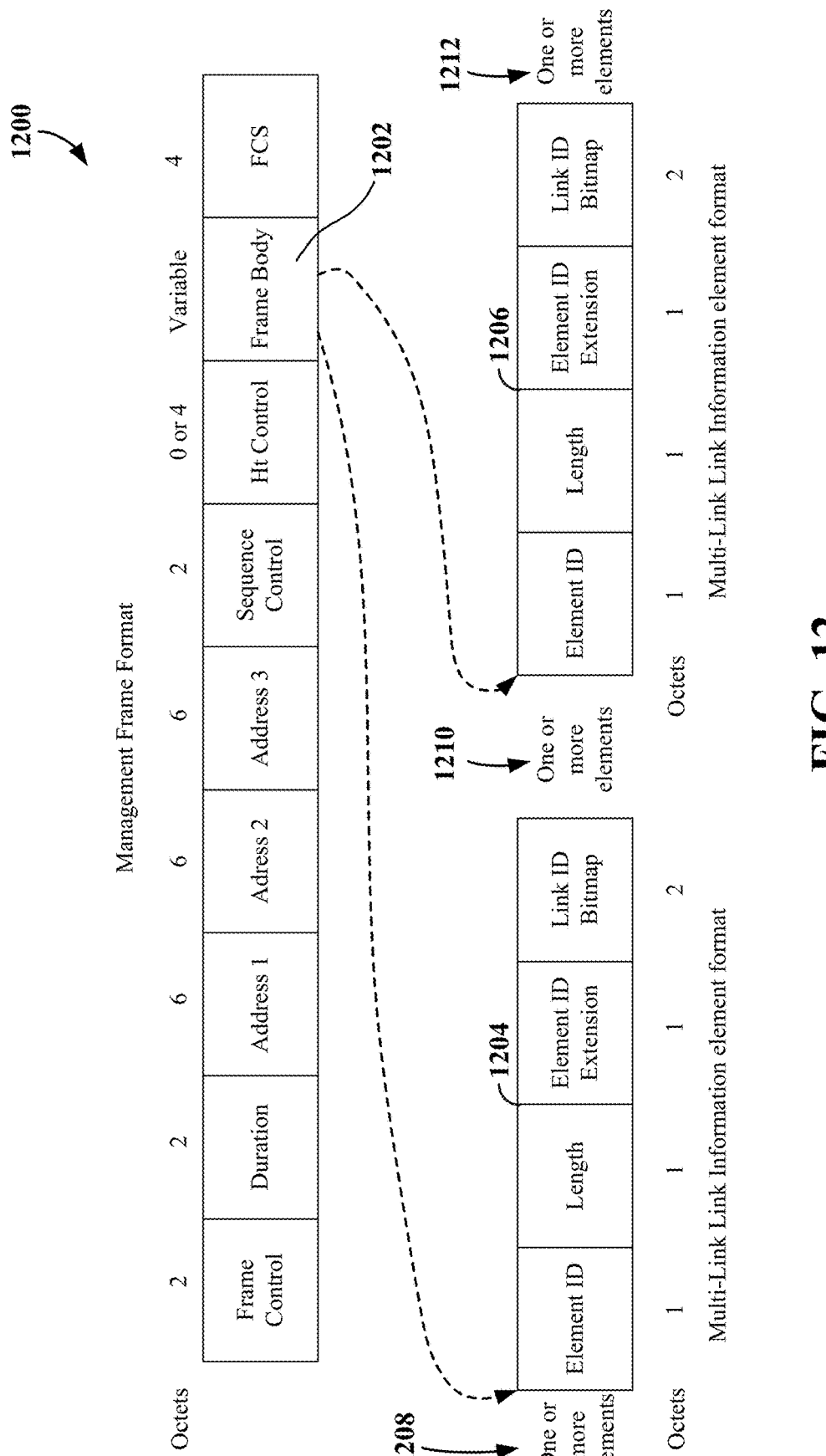
FIG. 12 is a conceptual illustration of an example of a management frame according to some aspects.

In a second example of signaling multi-link management information, a frame (e.g., a management frame) may contain one or more elements (e.g., information to be applied to links). For example, FIG. 12 illustrates an example of a management frame 1200 that may include fields similar to the frame 800 of FIG. 8. In this case, the frame body 1202 may include one or more ML Link IEs such as the ML Link IE 1204 and the ML Link IE 1206.

If there is no ML Link IE present in the management frame 1200, then any elements in the management frame 1200 (e.g., one or more elements 1208) apply at the MLD level. For example, the management information element included in the frame body 1202 may be applied to all of the links associated with the applicable MLD.

If one ML Link Information element is present in the management frame 1200, then, in one implementation, for any elements (e.g., one or more elements 1208) that precede the ML Link IE in the management frame 1200, these elements apply to the current link, while in another implementation, for any elements that precede the ML Link ID in the management frame 1200, these elements apply to the MLD level. In addition, for any elements (e.g., one or more elements 1210) that follow the ML Link IE in the management frame 1200, these elements apply to the links identified in the Link ID bitmap of ML Link IE.

If more than one ML Link IE is present in the management frame 1200, then the above rule applies except that a split may be applied between ML Link IEs. For example, any elements (e.g., one or more elements 1210) that follow a first ML Link IE apply to the links identified by the bitmap of the first ML Link IE, any elements (e.g., one or more elements 1212) that follow a second ML Link IE apply to the links identified by the bitmap of the second ML Link IE, and so on.

In any of the above scenarios, the originator of the management frame 1200 ensures that there is no overlapping information across the ML Link IEs. For example, the sub-elements for a first ML Link IE and the sub-elements for a second ML Link IE will not carry contradictory information for the same link.

Figure 13:
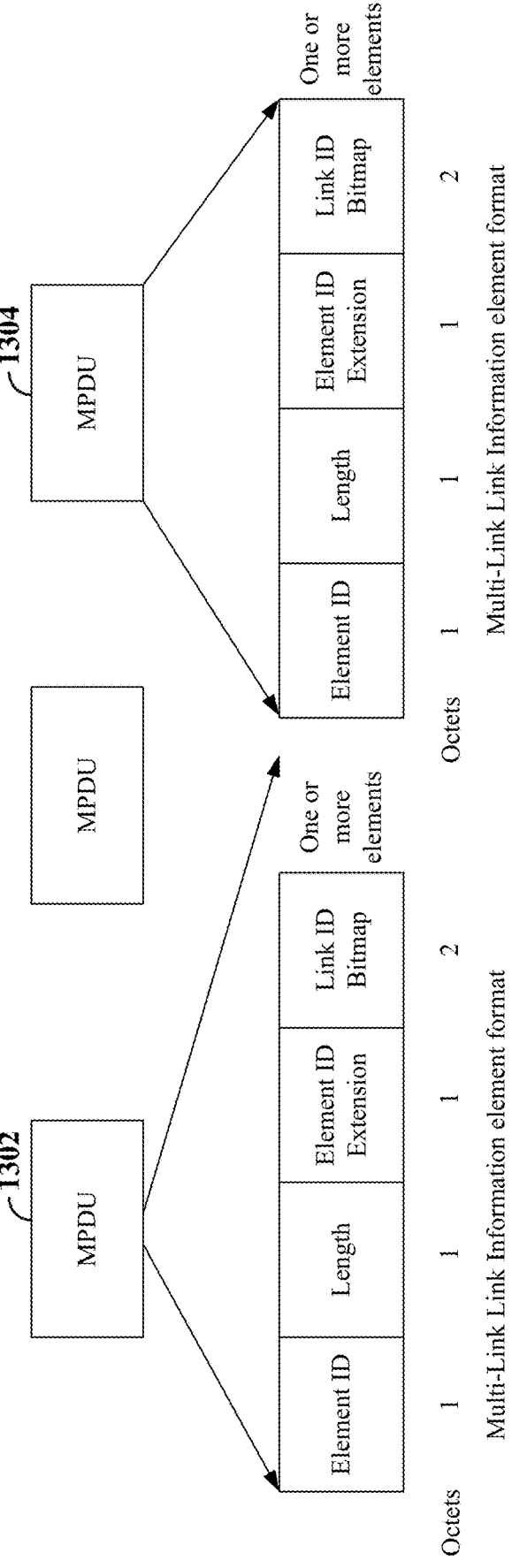
FIG. 13 is a conceptual illustration of an example of protocol data units according to some aspects.

In a third example of signaling multi-link management information, an A-MPDU contains one or more action frames, where each action frame contains at most one ML Link IE. For example, FIG. 13 illustrates an example of a first MAC PDU (MPDU) 1302 and a second MPDU 1304, where the first MPDU 1302 includes a single ML Link IE and the second MPDU 1304 includes a single ML Link IE.

To allow acknowledgment of each MPDU, a reserve traffic identifier (TID) value of a Multi-STA BlockAck (BA) is reserved for action frames. The BlockAck bitmap signals the successful receipt of each of the action frames in the soliciting A-MPDU. The BlockAck bitmap is carried in a BlockAck information field that contains the TID value (e.g., TID 15) reserved for action frames. As in the other examples, the originator of the action frame ensures that there is no overlapping information across the ML Link IEs.

In fourth example of signaling multi-link management information, a Link Information Variant ML element may be used to carry ML information. Since the ML Link IE has several characteristics that are similar to the previously defined Multi-Link element, instead of defining a new element, a Link Information Variant ML element may be defined. For example, FIG. 14 illustrates a Multi-Link element 1400 with a Link Information Variant ML element 1402.

Figure 15:
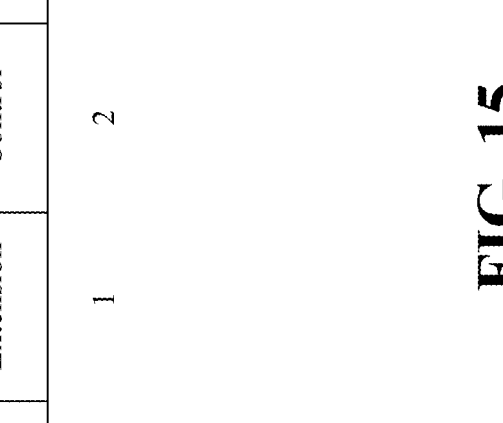
FIG. 15 is a conceptual illustration of another example of a multi-link element according to some aspects.

FIG. 15 illustrates an example of a Link Information Variant ML element 1500. The Link Information Variant ML element 1500 includes an element ID field 1502, a length field 1504, an element ID extension field 1506, a Multi-Link Control field 1508, and a Link Info field 1510. Other types of Multi-Link elements and/or other types of fields may be used in other examples.

The Link Info field 1510 contains STA profiles. Each STA profile contains the corresponding Link ID, and the list of sub-elements pertaining to this link. All the concepts discussed previously may apply here as well, except that the identification of the link is done using the Link ID rather than the bitmap.

Figure 16:
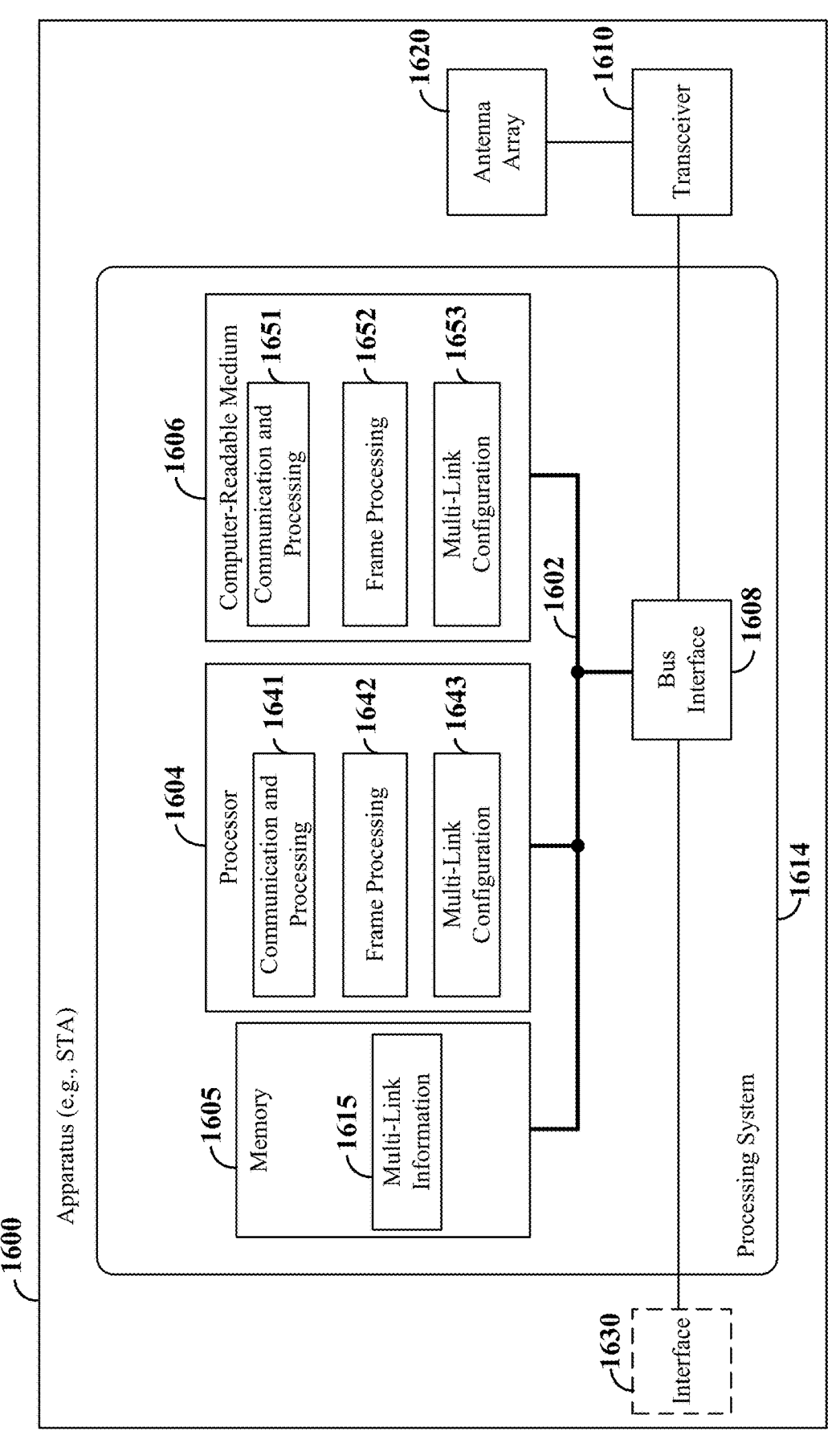
FIG. 16 is a block diagram conceptually illustrating an example of a hardware implementation for an apparatus (e.g., a wireless node such as a station) employing a processing system according to some aspects.

FIG. 16 is a block diagram illustrating an example of a hardware implementation for an apparatus 1600 employing a processing system 1614. In some implementations, the apparatus 1600 (e.g., a STA) may correspond to any of the STAs or other apparatuses illustrated in any one or more of FIGS. 1, 2, 3, 6, 7, and 19. In some examples, the apparatus 1600 (e.g., an AP) may correspond to any of the APs or other apparatuses illustrated in any one or more of FIGS. 1, 2, 3, 6, 7, and 19.

In accordance with various aspects of the disclosure, an element, or any portion of an element, or any combination of elements may be implemented with the processing system

1614 (e.g., that includes one or more processors 1604). Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1600 may be configured to perform any one or more of the functions described herein. That is, the processor 1604, as utilized in an apparatus 1600, may be used to implement any one or more of the processes and procedures described below.

The processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610 and between the bus 1602 and an interface 1630. The transceiver 1610 provides a communication interface or means for communicating with various other apparatus over a wireless transmission medium. The interface 1630 provides a communication interface or means of communicating with various other apparatuses and devices (e.g., other devices housed within the same apparatus as the apparatus 1600 or other external apparatuses) over an internal bus or external transmission medium, such as an Ethernet cable. Depending upon the nature of the apparatus, the interface 1630 may include a user interface (e.g., keypad, display, speaker, microphone, joystick). Of course, such a user interface is optional, and may be omitted in some examples, such as an IoT device.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software. For example, the memory 1605 may store Multi-Link information 1615 (e.g., management information, etc.) used by the processor 1604 for communication operations as described herein.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1600 may be configured to perform any one or more of the operations described herein (e.g., as described above in conjunction with FIGS. 1-15 and as described below in conjunction with FIGS. 17-18). In some aspects of the disclosure, the processor 1604, as utilized in the apparatus 1600, may include circuitry configured for various functions.

In implementations where the apparatus 1600 is a station, the processing system 1614 may be configured to monitor RF bands for management frames (e.g., including beacons) from access points, identify an access point to associate with, perform a carrier sense multiple access (CSMA) operation to determine whether at least one RF band is available for use (e.g., relatively free of traffic), and perform an association operation with the identified access point by transmitting an association request to the identified access point on the at least one RF band and receiving an association response from the identified access point on the at least one RF band. The processing system 1614 may also be configured to perform authentication, security, and other operations with the access point via signaling on the at least one RF band. The processing system 1614 may be configured monitor the at least one RF band for transmissions (e.g., management frames, control frames, and data frames) from the identified access point. The processing system may be configured to perform a CSMA operation on the at least one RF band to transmit a transmission (e.g., control frames, data frames, etc.) to the identified access point.

In implementations where the apparatus 1600 is an access point, the processing system 1614 may be configured to transmit management frames (e.g., including beacons) on designated RF bands. The processing system 1614 may also be configured to monitor the RF bands for transmissions (e.g., association requests) from a STA on at least one RF band. The processing system 1614 may also be configured to associate the STA with the apparatus 1600 by transmitting an association response to the STA on the at least one RF band. The processing system 1614 may also be configured to perform authentication, security, and other operations with the STA via signaling on the at least one RF band. The processing system 1614 may be configured monitor the at least one RF band for transmissions (e.g., management frames, control frames, and data frames) from the STA. The processing system may be configured to perform a CSMA operation on the at least one RF band to transmit a transmission (e.g., management frames, control frames, data frames, etc.) to the STA.

The processor 1604 may include communication and processing circuitry 1641. The communication and processing circuitry 1641 may include one or more hardware components that provide the physical structure that performs various processes related to wireless communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. In some examples, the communication and processing circuitry 1641 may include two or more transmit/receive chains, each configured to process signals in a different RAT (or RAN) type. The communication and processing circuitry 1641 may further be configured to execute communication and processing software 1651 included on the computer-readable medium 1606 to implement one or more functions described herein.

In some implementations where the communication involves obtaining (e.g., receiving) information, the communication and processing circuitry 1641 may obtain information from a component of the apparatus 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for obtaining (e.g., obtaining a message from another device). In some examples, the communication and processing circuitry 1641 and/or the transceiver 1610 may include functionality for a means for receiving (e.g., receiving a message via RF signaling). In some examples, the communication and processing circuitry 1641 may include functionality for a means for decoding.

In some implementations where the communication involves outputting (e.g., sending) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for outputting (e.g., outputting a message to another device). In some examples, the communication and processing circuitry 1641 and/or the transceiver 1610 may include functionality for a means for transmitting (e.g., transmitting a message via RF signaling). In some examples, the communication and processing circuitry 1641 may include functionality for a means for encoding.

The communication and processing circuitry 1641 may include functionality for a means for outputting a frame. For example, the communication and processing circuitry 1641 may be configured to generate a frame and cooperate with the transceiver 1610 output the frame for transmission on one or more designated RF bands (e.g., on one or more channels associated with a BSS). In some examples, the frame may carry information such as MAC addresses, an AID, a PN, SNs, and TIDs.

The communication and processing circuitry 1641 may include functionality for a means for obtaining a message. For example, the communication and processing circuitry 1641 may cooperate with the transceiver 1610 to monitor one or more designated RF bands (e.g., bands specified by an IEEE 802.11 standard) for a frame sent by another device (e.g., an STA). The communication and processing circuitry 1641 may be configured to parse the contents of the frame to extract information carried by the frame (e.g., MAC addresses, multi-link information, etc.).

The processor 1604 may include frame processing circuitry 1642 configured to perform frame processing-related operations as discussed herein. The frame processing circuitry 1642 may be configured to execute frame processing software 1652 included on the computer-readable medium 1606 to implement one or more functions described herein.

The frame processing circuitry 1642 may include functionality for a means for generating a frame. For example, the frame processing circuitry 1642 may be configured to generate a management (e.g., action) frame that that includes a multi-link bitmap and/or information sub-elements as described herein.

The frame processing circuitry 1642 may include functionality for a means for outputting a frame. For example, the frame processing circuitry 1642 may be configured to output a frame to be transmitted on a designated link.

The frame processing circuitry 1642 may include functionality for a means for obtaining information. For example, the frame processing circuitry 1642 may be configured to obtain a management frame and parse the management frame to identify multi-link information contained within the frame.

The frame processing circuitry 1642 may include functionality for a means for setting a bit. For example, the frame processing circuitry 1642 may be configured to set at least one bit of the first bitmap to indicate at least one link of the first plurality of links to which the first management information applies.

The processor 1604 may include multi-link configuration circuitry 1643 configured to perform multi-link configuration-related operations as discussed herein. The multi-link configuration circuitry 1643 may be configured to execute multi-link configuration software 1653 included on the computer-readable medium 1606 to implement one or more functions described herein.

The multi-link configuration circuitry 1643 may include functionality for a means for outputting information. For example, the multi-link configuration circuitry 1943 may be configured to provide management information associated with a link that is to be output for transmission.

The multi-link configuration circuitry 1643 may include functionality for a means for obtaining information. For example, the multi-link configuration circuitry 1943 may be configured to process management information associated with a link that is obtained via a transmission.

FIG. 17 is a flow chart illustrating an example method 1700 for communication in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the apparatus 1600 illustrated in FIG. 16. In some examples, the method 1700 may be carried out by the apparatus 602 illustrated in FIG. 6. In some examples, the method 1700 may be performed by an access point or a STA. In some examples, the method 1700 may be carried out by any suitable apparatus or means for carrying out the functions or algorithm described below.

At block 1702, a first apparatus may generate a first frame that includes a first information element, the first information element including a first bitmap, the first information element further including a first sub-element field that includes first management information to be applied to each link of a first plurality of links indicated by the first bitmap. For example, the frame processing circuitry 1642 and/or the communication and processing circuitry 1641 and the transceiver 1610, shown and described above in connection with FIG. 16, may provide a means to generate a first frame that includes a first information element, the first information element including a first bitmap, the first information element further including a first sub-element field that includes first management information to be applied to each link of a first plurality of links indicated by the first bitmap.

At block 1704, the first apparatus may output the first frame for transmission to a second apparatus. For example, the frame processing circuitry 1642 and/or the communication and processing circuitry 1641 and the transceiver 1610, shown and described above in connection with FIG. 16, may provide a means to output the first frame for transmission to a second apparatus.

In some examples, the first frame may include at least one action frame that includes the first information element.

In some examples, the first frame further may include a second information element. In some examples, the second information element includes a second bitmap. In some examples, the second information element further includes a second sub-element field including second management information to be applied to each link of a second plurality of links indicated by the second bitmap. In some examples, there is no overlapping information between the first management information and the second management information.

In some examples, the first frame further may include a second information element. In some examples, the second information element includes a second bitmap that identifies the same links as the first bitmap. In some examples, the second information element further includes a second sub-element field including second management information for each link of the first plurality of links indicated by the second bitmap.

In some examples, the first apparatus may set at least one bit of the first bitmap to indicate at least one link of the first plurality of links to which the first management information applies.

In some examples, the first frame further may include second management information that precedes the first information element and that is applicable to a currently active link used by the first apparatus for communication with the second apparatus or to all multi-level links associated with the first apparatus.

In some examples, the first management information includes a target wait time information element.

In some examples, the first frame further may include second management information that precedes the first information element within the first frame, the second management information to be applied to at least one link other than each link of the first plurality of links indicated by the first bitmap.

In some examples, the first frame further may include a second information element that follows the first information element within the first frame. In some examples, the second information element includes a second bitmap. In some examples, the second information element further includes a second sub-element field including third management information to be applied to each link of a second plurality of links indicated by the second bitmap. In some examples, there is no overlapping information among the first management information, the second management information, and the third management information. In some examples, the at least one link is different from each link of the second plurality of links indicated by the second bitmap.

In some examples, the at least one link is a currently active link used by the first apparatus for communication with the second apparatus. In some examples, the at least one link may include all multi-level links associated with the first apparatus.

In some examples, the first apparatus includes a transceiver configured to transmit the first frame, wherein the first apparatus is configured as a station.

FIG. 18 is a flow chart illustrating an example method 1800 for communication in accordance with some aspects of the present disclosure. As described below, some or all illustrated features may be omitted in a particular implementation within the scope of the present disclosure, and some illustrated features may not be required for implementation of all examples. In some examples, the method 1800 may be carried out by the apparatus 1600 illustrated in FIG. 16. In some examples, the method 1800 may be carried out by the apparatus 602 illustrated in FIG. 6. In some examples, the method 1800 may be performed by an access point or a STA. In some examples, the method 1800 may be carried out by any suitable apparatus or means for carrying out the functions or algorithm described below.

At block 1802, a first apparatus may generate a first frame that includes a first information element, the first information element including a first bitmap, the first information element further including a first sub-element field that includes first management information to be applied to each link of a first plurality of links indicated by the first bitmap, the first frame further including second management information that precedes the first information element within the first frame, the second management information to be applied to at least one link other than each link of the first plurality of links indicated by the first bitmap. For example, the frame processing circuitry 1642 and/or the communication and processing circuitry 1641 and the transceiver 1610, shown and described above in connection with FIG. 16, may provide a means to generate a first frame that includes a first information element, the first information element including a first bitmap, the first information element further including a first sub-element field that includes first management information to be applied to each link of a first plurality of links indicated by the first bitmap, the first frame further including second management information that precedes the first information element within the first frame, the second management information to be applied to at least one link other than each link of the first plurality of links indicated by the first bitmap.

At block 1804, the first apparatus may output the first frame for transmission to a second apparatus. For example, the frame processing circuitry 1642 and/or the communication and processing circuitry 1641 and the transceiver 1610, shown and described above in connection with FIG. 16, may provide a means to output the first frame for transmission to a second apparatus.

Referring again to FIG. 16, in one configuration, the apparatus 1600 includes means for generating a first frame that includes a first information element, the first information element including a first bitmap, the first information element further including a first sub-element field that includes first management information to be applied to each link of a first plurality of links indicated by the first bitmap, and means for outputting the first frame for transmission to a second apparatus. In one configuration, the apparatus 1600 includes means for generating a first frame that includes a first information element, the first information element including a first bitmap, the first information element further including a first sub-element field that includes first management information to be applied to each link of a first plurality of links indicated by the first bitmap, the first frame further including second management information that precedes the first information element within the first frame, the second management information to be applied to at least one link other than each link of the first plurality of links indicated by the first bitmap, and means for outputting the first frame for transmission to a second apparatus. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 3, 4, 5, 6, 7, and 16, and utilizing, for example, the methods and/or algorithms described herein in relation to FIGS. 17-18.

Figure 19:
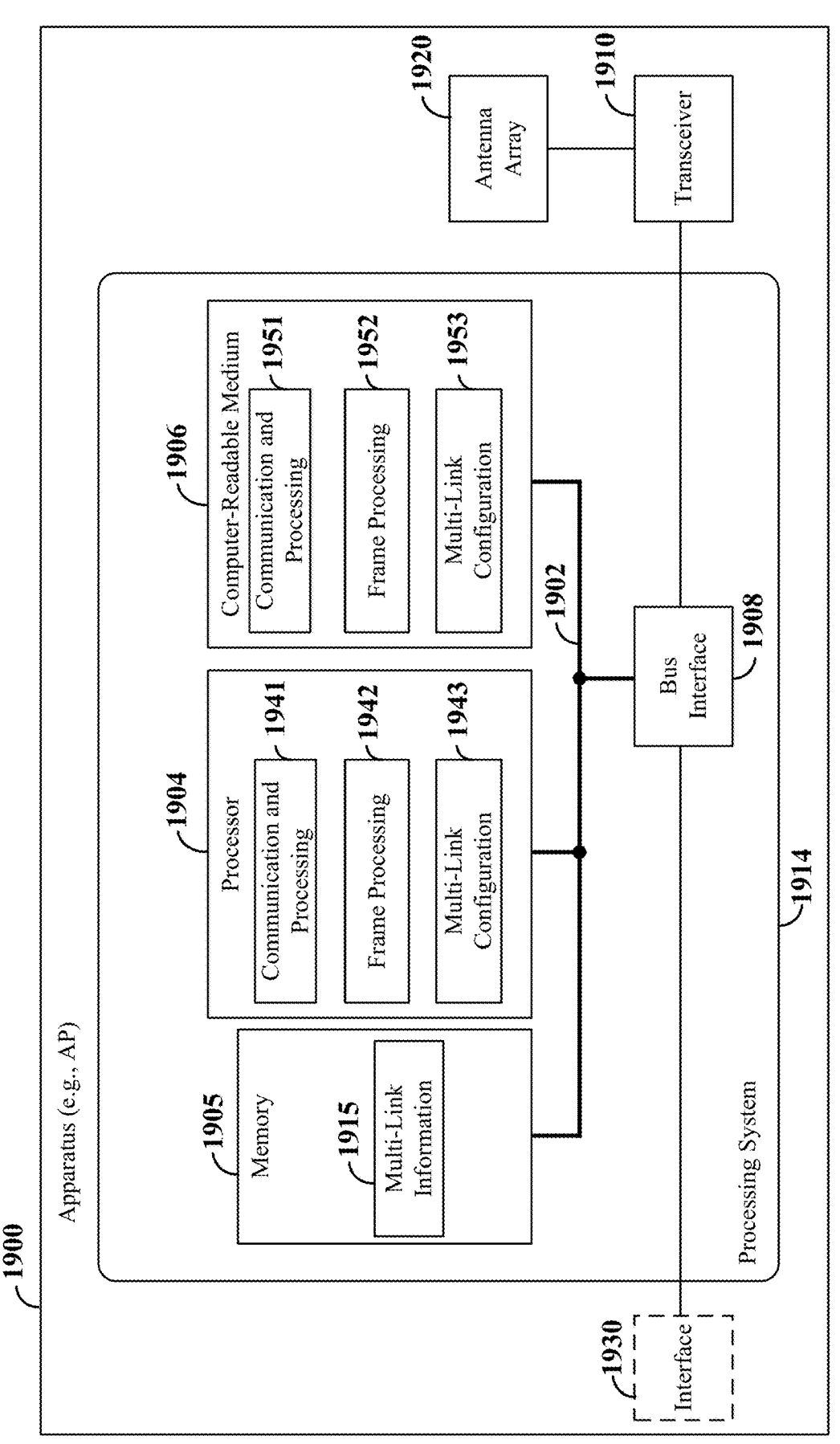
FIG. 19 is a block diagram conceptually illustrating an example of a hardware implementation for an apparatus (e.g., a wireless node such as an access point) employing a processing system according to some aspects of the disclosure.

FIG. 19 is a conceptual diagram illustrating an example of a hardware implementation for an apparatus 1900 employing a processing system 1914. In some examples, the apparatus 1900 (e.g., an AP) may correspond to any of the APs or other apparatuses illustrated in any one or more of FIGS. 1, 2, 3, 6, 7, and 16. In some implementations, the apparatus 1900 (e.g., a STA) may correspond to any of the STAs or other apparatuses illustrated in any one or more of FIGS. 1, 2, 3, 6, 7, and 16.

In accordance with various aspects of the disclosure, an element, or any portion of an element, or any combination of elements may be implemented with the processing system 1914 (e.g., that includes one or more processors 1904). The processing system 1914 may be substantially the same as the processing system 1614 illustrated in FIG. 16, including a bus interface 1908, a bus 1902, memory 1905, a processor 1904, and a computer-readable medium 1906. Furthermore, the apparatus 1900 may include an interface 1930 (e.g., a network interface) that provides a means for communicating with at least one other apparatus within at least one radio network. The memory 1905 may store Multi-Link information 1915 (e.g., management information, etc.) used by the processor 1904 for communication operations as described herein.

The apparatus 1900 may be configured to perform any one or more of the operations described herein (e.g., as described above in conjunction with FIGS. 1-15 and as described below in conjunction with FIGS. 20-21). In some aspects of the disclosure, the processor 1904, as utilized in the apparatus 1900, may include circuitry configured for various functions.

In implementations where the apparatus 1900 is a station, the processing system 1914 may be configured to monitor RF bands for management frames (e.g., including beacons) from access points, identify an access point to associate with, perform a carrier sense multiple access (CSMA) operation to determine whether at least one RF band is available for use (e.g., relatively free of traffic), and perform an association operation with the identified access point by transmitting an association request to the identified access point on the at least one RF band and receiving an association response from the identified access point on the at least one RF band. The processing system 1914 may also be configured to perform authentication, security, and other operations with the access point via signaling on the at least one RF band. The processing system 1914 may be configured monitor the at least one RF band for transmissions (e.g., management frames, control frames, and data frames) from the identified access point. The processing system may be configured to perform a CSMA operation on the at least one RF band to transmit a transmission (e.g., control frames, data frames, etc.) to the identified access point.

In implementations where the apparatus 1900 is an access point, the processing system 1914 may be configured to transmit management frames (e.g., including beacons) on designated RF bands. The processing system 1914 may also be configured to monitor the RF bands for transmissions (e.g., association requests) from a STA on at least one RF band. The processing system 1914 may also be configured to associate the STA with the apparatus 1900 by transmitting an association response to the STA on the at least one RF band. The processing system 1914 may also be configured to perform authentication, security, and other operations with the STA via signaling on the at least one RF band. The processing system 1914 may be configured monitor the at least one RF band for transmissions (e.g., management frames, control frames, and data frames) from the STA. The processing system may be configured to perform a CSMA operation on the at least one RF band to transmit a transmission (e.g., management frames, control frames, data frames, etc.) to the STA.

In some aspects of the disclosure, the processor 1904 may include communication and processing circuitry 1941. The communication and processing circuitry 1941 may include one or more hardware components that provide the physical structure that performs various processes related to communication (e.g., signal reception and/or signal transmission) as described herein. The communication and processing circuitry 1941 may further include one or more hardware components that provide the physical structure that performs various processes related to signal processing (e.g., processing a received signal and/or processing a signal for transmission) as described herein. The communication and processing circuitry 1941 may further be configured to execute communication and processing software 1951 included on the computer-readable medium 1906 to implement one or more functions described herein.

In some implementations where the communication involves obtaining (e.g., receiving) information, the communication and processing circuitry 1941 may obtain information from a component of the apparatus 1900 (e.g., from the transceiver 1910 that receives the information via radio frequency signaling or some other type of signaling suitable for the applicable communication medium), process (e.g., decode) the information, and output the processed information. For example, the communication and processing circuitry 1941 may output the information to another component of the processor 1904, to the memory 1905, or to the bus interface 1908. In some examples, the communication and processing circuitry 1941 may receive one or more of signals, messages, other information, or any combination thereof. In some examples, the communication and processing circuitry 1941 may receive information via one or more channels. In some examples, the communication and processing circuitry 1941 may include functionality for a means for obtaining (e.g., obtaining a message from another device). In some examples, the communication and processing circuitry 1941 and/or the transceiver 1910 may include functionality for a means for receiving (e.g., receiving a message via RF signaling). In some examples, the communication and processing circuitry 1941 may include functionality for a means for decoding.

In some implementations where the communication involves outputting (e.g., transmitting) information, the communication and processing circuitry 1941 may obtain information (e.g., from another component of the processor 1904, the memory 1905, or the bus interface 1908), process (e.g., encode) the information, and output the processed information. For example, the communication and processing circuitry 1941 may output the information to the transceiver 1910 (e.g., that transmits the information via radio frequency signaling or some other type of signaling suitable for the applicable communication medium). In some examples, the communication and processing circuitry 1941 may send one or more of signals, messages, other information, or any combination thereof. In some examples, the communication and processing circuitry 1941 may send information via one or more channels. In some examples, the communication and processing circuitry 1941 may include functionality for a means for outputting (e.g., outputting a message to another device). In some examples, the communication and processing circuitry 1941 and/or the transceiver 1910 may include functionality for a means for transmitting (e.g., transmitting a message, a beacon, etc., via RF signaling). In some examples, the communication and processing circuitry 1941 may include functionality for a means for encoding.

The communication and processing circuitry 1941 may include functionality for a means for obtaining a message. For example, the communication and processing circuitry 1941 may be configured to monitor one or more designated RF bands (e.g., bands specified by an IEEE 802.11 standard) for a frame sent by another device (e.g., an STA). The communication and processing circuitry 1941 may be configured to parse the contents of the frame to extract information carried by the frame (e.g., MAC addresses, multi-link information, etc.).

The communication and processing circuitry 1941 may include functionality for a means for outputting a frame. For example, the communication and processing circuitry 1941 may be configured to generate a frame and cooperate with the transceiver 1910 output the frame for transmission on one or more designated RF bands (e.g., on one or more channels associated with a BSS). In some examples, the frame may carry information such as MAC addresses, an AID, a PN, SNs, and TIDs.

The processor 1904 may include frame processing circuitry 1942 configured to perform frame processing-related operations as discussed herein. The frame processing circuitry 1942 may be configured to execute frame processing software 1952 included on the computer-readable medium 1906 to implement one or more functions described herein.

The frame processing circuitry 1942 may include functionality for a means for obtaining information. For example, the frame processing circuitry 1942 may be configured to obtain a management frame and parse the management frame to identify multi-link information contained within the frame.

The frame processing circuitry 1942 may include functionality for a means for outputting information. For example, the frame processing circuitry 1942 may be configured to generate a transmission for a link based on management information associated with the link.

The processor 1904 may include multi-link configuration circuitry 1943 configured to perform multi-link configuration-related operations as discussed herein. The multi-link configuration circuitry 1943 may be configured to execute multi-link configuration software 1953 included on the computer-readable medium 1906 to implement one or more functions described herein.

The multi-link configuration circuitry 1943 may include functionality for a means for obtaining information. For example, the multi-link configuration circuitry 1943 may be configured to process management information associated with a link that is obtained via a transmission.

The multi-link configuration circuitry 1943 may include functionality for a means for outputting information. For example, the multi-link configuration circuitry 1943 may be configured to provide management information associated with a link that is to be output for transmission.

FIG. 20 is a flow chart illustrating an example method 2000 for communication in accordance with some aspects of the present disclosure. As described below, some or all illustrated features may be omitted in a particular implementation within the scope of the present disclosure, and some illustrated features may not be required for implementation of all examples. In some examples, the method 2000 may be carried out by the apparatus 1900 illustrated in FIG. 19. In some examples, the method 2000 may be carried out by the apparatus 602 illustrated in FIG. 6. In some examples, the method 2000 may be performed by a STA or an access point. In some examples, the method 2000 may be carried out by any suitable apparatus or means for carrying out the functions or algorithm described below.

At block 2002, a first apparatus may obtain a first frame that includes a first information element, the first information element including a first bitmap, the first information element further including a first sub-element field that includes first management information to be applied to each link of a first plurality of links indicated by the first bitmap. For example, the frame processing circuitry 1942, shown and described above in connection with FIG. 19, may provide a means to obtain a first frame that includes a first information element, the first information element including a first bitmap, the first information element further including a first sub-element field that includes first management information to be applied to each link of a first plurality of links indicated by the first bitmap. As another example, the frame processing circuitry 1942 and/or the communication and processing circuitry 1941 and the transceiver 1910, shown and described above in connection with FIG. 19, may provide a means to obtain a first frame that includes a first information element, the first information element including a first bitmap, the first information element further including a first sub-element field that includes first management information to be applied to each link of a first plurality of links indicated by the first bitmap.

At block 2004, the first apparatus may output at least one second frame for transmission to a second apparatus via the first plurality of links based on the first information element. For example, the frame processing circuitry 1942, shown and described above in connection with FIG. 19, may provide a means to output at least one second frame for transmission (e.g., to a second apparatus) via the first plurality of links based on the first information element. As another example, the frame processing circuitry 1942 and/or the communication and processing circuitry 1941 and the transceiver 1910, shown and described above in connection with FIG. 19, may provide a means to output at least one second frame for transmission to a second apparatus via the first plurality of links based on the first information element.

In some examples, the first frame further may include a second information element. In some examples, the second information element includes a second bitmap. In some examples, the second information element further includes a second sub-element field including second management information to be applied to each link of a second plurality of links indicated by the second bitmap. In some examples, the first apparatus may output, based on the second management information, at least one third frame for transmission via each link of the second plurality of links indicated by the second bitmap.

In some examples, the first frame further may include a second information element. In some examples, the second information element includes a second bitmap that identifies the same links as the first bitmap. In some examples, the second information element further includes a second sub-element field including second management information for each link of the first plurality of links indicated by the second bitmap. In some examples, the first apparatus may output, based on the second management information, at least one third frame for transmission via each link of the first plurality of links indicated by the second bitmap.

In some examples, the first frame further may include second management information that precedes the first information element and is applicable to a currently active link used by the second apparatus for communication with the first apparatus or to all multi-level links associated with the first apparatus. In some examples, the first apparatus may output, based on the second management information, at least one third frame for transmission via the currently active link used by the second apparatus or via all of the multi-level links associated with the first apparatus.

In some examples, the first management information may include target wait time information.

In some examples, the first frame further may include second management information that precedes the first information element within the first frame, the second management information to be applied to at least one other link different from each link of the first plurality of links indicated by the first bitmap. In some examples, the first apparatus may output at least one third frame for transmission via the at least one other link based on the second management information.

In some examples, the first frame further may include a second information element that follows the first information element within the first frame. In some examples, the second information element includes a second bitmap. In some examples, the second information element further includes a second sub-element field including third management information to be applied to each link of a second plurality of links indicated by the second bitmap. In some examples, the first apparatus may output, based on the second management information, at least one fourth frame for transmission via each link of the second plurality of links indicated by the second bitmap. In some examples, the at least one other link is different from each link of the second plurality of links indicated by the second bitmap.

In some examples, the at least one other link is a currently active link used by the second apparatus for communication with the first apparatus. In some examples, the at least one other link may include all multi-level links associated with the first apparatus.

In some examples, the first apparatus includes a transceiver configured to receive the first frame and transmit the at least one second frame, wherein the first apparatus is configured as an access point.

FIG. 21 is a flow chart illustrating an example method 2100 for communication in accordance with some aspects of the present disclosure. As described below, some or all illustrated features may be omitted in a particular implementation within the scope of the present disclosure, and some illustrated features may not be required for implementation of all examples. In some examples, the method 2100 may be carried out by the apparatus 1900 illustrated in FIG. 19. In some examples, the method 2100 may be carried out by the apparatus 602 illustrated in FIG. 6. In some examples, the method 2100 may be performed by a STA or an access point. In some examples, the method 2100 may be carried out by any suitable apparatus or means for carrying out the functions or algorithm described below.

At block 2102, a first apparatus may obtain a first frame that includes a first information element, the first information element including a first bitmap, the first information element further including a first sub-element field that includes first management information to be applied to each link of a first plurality of links indicated by the first bitmap, the first frame further including second management information that precedes the first information element within the first frame, the second management information to be applied to at least one link other than each link of the first plurality of links indicated by the first bitmap. For example, the frame processing circuitry 1942, shown and described above in connection with FIG. 19, may provide a means to obtain a first frame that includes a first information element, the first information element including a first bitmap, the first information element further including a first sub-element field that includes first management information to be applied to each link of a first plurality of links indicated by the first bitmap, the first frame further including second management information that precedes the first information element within the first frame, the second management information to be applied to at least one link other than each link of the first plurality of links indicated by the first bitmap. As another example, the frame processing circuitry 1942 and/or the communication and processing circuitry 1941 and the transceiver 1910, shown and described above in connection with FIG. 19, may provide a means to obtain a first frame that includes a first information element, the first information element including a first bitmap, the first information element further including a first sub-element field that includes first management information to be applied to each link of a first plurality of links indicated by the first bitmap, the first frame further including second management information that precedes the first information element within the first frame, the second management information to be applied to at least one link other than each link of the first plurality of links indicated by the first bitmap.

At block 2104, the first apparatus may output at least one second frame for transmission via the first plurality of links based on the first management information. For example, the frame processing circuitry 1942, shown and described above in connection with FIG. 19, may provide a means to output at least one second frame for transmission via the first plurality of links based on the first management information. As another example, the frame processing circuitry 1942 and/or the communication and processing circuitry 1941 and the transceiver 1910, shown and described above in connection with FIG. 19, may provide a means to output at least one second frame for transmission via the first plurality of links based on the first management information.

At block 2106, the first apparatus may output at least one third frame for transmission via the at least one other link based on the second management information. For example, the frame processing circuitry 1942, shown and described above in connection with FIG. 19, may provide a means to output at least one third frame for transmission via the at least one other link based on the second management information. As another example, the frame processing circuitry 1942 and/or the communication and processing circuitry 1941 and the transceiver 1910, shown and described above in connection with FIG. 19, may provide a means to output at least one third frame for transmission via the at least one other link based on the second management information.

Referring again to FIG. 19, in one configuration, the apparatus 1900 includes means for obtaining a first frame that includes a first information element, the first information element including a first bitmap, the first information element further including a first sub-element field that includes first management information to be applied to each link of a first plurality of links indicated by the first bitmap, and means for outputting at least one second frame for transmission to a second apparatus via the first plurality of links based on the first information element. In one configuration, the apparatus 1900 includes means for obtaining a first frame that includes a first information element, the first information element including a first bitmap, the first information element further including a first sub-element field that includes first management information to be applied to each link of a first plurality of links indicated by the first bitmap, the first frame further including second management information that precedes the first information element within the first frame, the second management information to be applied to at least one link other than each link of the first plurality of links indicated by the first bitmap, means for outputting at least one second frame for transmission via the first plurality of links based on the first management information, and means for outputting at least one third frame for transmission via the at least one other link based on the second management information. In one aspect, the aforementioned means may be the processor 1904 shown in FIG. 19 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable medium 1906, or any other suitable apparatus or means described in any one or more of FIGS. 1, 2, 3, 4, 5, 6, 7, and 19, and utilizing, for example, the methods and/or algorithms described herein in relation to FIGS. 20-21.

The methods shown in FIGS. 17-18 and 20-21 may include additional aspects, such as any single aspect or any combination of aspects described below and/or in connection with one or more other processes described elsewhere herein. The following provides an overview of several aspects of the present disclosure.

Aspect 1: A method for wireless communication at a first apparatus (e.g., a station), the method comprising: generating a first frame comprising a first information element, the first information element including a first bitmap, the first information element further including a first sub-element field that includes first management information to be applied to each link of a first plurality of links indicated by the first bitmap; and outputting the first frame for transmission to a second apparatus.

Aspect 2: The method of aspect 1, wherein the first frame comprises at least one action frame that includes the first information element.

Aspect 3: The method of aspect 1 through 2, wherein: the first frame further comprises a second information element; the second information element includes a second bitmap; and the second information element further includes a second sub-element field including second management information to be applied to each link of a second plurality of links indicated by the second bitmap.

Aspect 4: The method of aspect 3, wherein there is no overlapping information between the first management information and the second management information.

Aspect 5: The method of any of aspects 1 through 2, wherein: the first frame further comprises a second information element; the second information element includes a second bitmap that identifies the same links as the first bitmap; and the second information element further includes a second sub-element field including second management information for each link of the first plurality of links indicated by the second bitmap.

Aspect 6: The method of any of aspects 1 through 5, further comprising: setting at least one bit of the first bitmap to indicate at least one link of the first plurality of links to which the first management information applies.

Aspect 7: The method of any of aspects 1 through 6, wherein the first frame further comprises second management information that precedes the first information element and that is applicable to a currently active link used by the first apparatus for communication with the second apparatus or to all multi-level links associated with the first apparatus.

Aspect 8: The method of any of aspects 1 through 7, wherein the first management information includes a target wait time information element.

Aspect 9: The method of any of aspects 1, 2, 6, or 8, wherein the first frame further comprises second management information that precedes the first information element within the first frame, the second management information to be applied to at least one link other than each link of the first plurality of links indicated by the first bitmap.

Aspect 10: The method of aspect 9, wherein: the first frame further comprises a second information element that follows the first information element within the first frame; the second information element includes a second bitmap; and the second information element further includes a second sub-element field including third management information to be applied to each link of a second plurality of links indicated by the second bitmap.

Aspect 11: The method of aspect 10, wherein there is no overlapping information among the first management information, the second management information, and the third management information.

Aspect 12: The method of any of aspects 10 through 11, wherein the at least one link is different from each link of the second plurality of links indicated by the second bitmap.

Aspect 13: The method of any of aspects 9 through 12, wherein the at least one link is a currently active link used by the first apparatus for communication with the second apparatus.

Aspect 14: The method of any of aspects 9 through 13, wherein the at least one link comprises all multi-level links associated with the first apparatus.

Aspect 16: A method for wireless communication at a first apparatus (e.g., an access point), the method comprising: obtaining a first frame comprising a first information element, the first information element including a first bitmap, the first information element further including a first sub-element field that includes first management information to be applied to each link of a first plurality of links indicated by the first bitmap; and outputting at least one second frame for transmission to a second apparatus via the first plurality of links based on the first information element.

Aspect 17: The method of aspect 16, wherein: the first frame further comprises a second information element; the second information element includes a second bitmap; and the second information element further includes a second sub-element field including second management information to be applied to each link of a second plurality of links indicated by the second bitmap.

Aspect 18: The method of aspect 17, further comprising: outputting, based on the second management information, at least one third frame for transmission via each link of the second plurality of links indicated by the second bitmap.

Aspect 19: The method of aspect 16, wherein: the first frame further comprises a second information element; the second information element includes a second bitmap that identifies the same links as the first bitmap; and the second information element further includes a second sub-element field including second management information for each link of the first plurality of links indicated by the second bitmap.

Aspect 20: The method of aspect 19, further comprising: outputting, based on the second management information, at least one third frame for transmission via each link of the first plurality of links indicated by the second bitmap.

Aspect 21: The method of aspect 16, wherein: first frame further comprises second management information that precedes the first information element and is applicable to a currently active link used by the second apparatus for communication with the first apparatus or to all multi-level links associated with the first apparatus; and the method further comprises outputting, based on the second management information, at least one third frame for transmission via the currently active link used by the second apparatus or via all of the multi-level links associated with the first apparatus.

Aspect 22: The method of any of aspects 16 through 21, wherein the first management information comprises target wait time information.

Aspect 23: The method of any of aspects 16 or 22, wherein: the first frame further comprises second management information that precedes the first information element within the first frame, the second management information to be applied to at least one other link that is different from each link of the first plurality of links indicated by the first bitmap; and the method further comprises outputting at least one third frame for transmission via the at least one other link based on the second management information.

Aspect 24: The method of aspect 23, wherein: the first frame further comprises a second information element that follows the first information element within the first frame; the second information element includes a second bitmap; and the second information element further includes a second sub-element field including third management information to be applied to each link of a second plurality of links indicated by the second bitmap.

Aspect 25: The method of aspect 24, further comprising: outputting, based on the second management information, at least one fourth frame for transmission via each link of the second plurality of links indicated by the second bitmap.

Aspect 26: The method of any of aspects 24 through 25, wherein the at least one other link is different from each link of the second plurality of links indicated by the second bitmap.

Aspect 27: The method of any of aspects 23 through 26, wherein: the at least one other link is a currently active link used by the second apparatus for communication with the first apparatus; or the at least one other link comprises all multi-level links associated with the first apparatus.

Aspect 28: The method of any of aspects 16 through 27, further comprising: receiving the first frame; and transmitting the at least one second frame, wherein the first apparatus is configured as an access point.

Aspect 29: A station, comprising: at least one transceiver; a memory comprising instructions; and one or more processors configured to execute the instructions and cause the station to perform a method in accordance with any one or more of aspects 1-14, wherein the at least one transceiver is configured to transmit the fourth signal.

Aspect 30: A first apparatus configured for communication comprising at least one means for performing any one or more of aspects 1 through 14.

Aspect 31: A non-transitory computer-readable medium storing computer-executable code, comprising code for causing a first apparatus to perform any one or more of aspects 1 through 14.

Aspect 32: A first apparatus, comprising: a memory comprising instructions; and one or more processors configured to execute the instructions and cause the first apparatus to perform a method in accordance with any one or more of aspects 1-14.

Aspect 33: An access point, comprising: at least one transceiver; a memory comprising instructions; and one or more processors configured to execute the instructions and cause the station to perform a method in accordance with any one or more of aspects 16-27, wherein the at least one transceiver is configured to transmit the fourth signal.

Aspect 34: A first apparatus configured for communication comprising at least one means for performing any one or more of aspects 16 through 28.

Aspect 35: A non-transitory computer-readable medium storing computer-executable code, comprising code for causing a first apparatus to perform any one or more of aspects 16 through 28.

Aspect 36: A first apparatus, comprising: a memory comprising instructions; and one or more processors configured to execute the instructions and cause the first apparatus to perform a method in accordance with any one or more of aspects 16-27.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within systems defined by the IEEE 802.11 (Wi-Fi) standards such as 802.11ax, 802.11be, and so on. Various aspects may also be extended to systems defined by the 3rd Generation Partnership Project (3GPP) such 5G, as Long-Term Evolution (LTE), the Evolved Packet System (EPS), the Universal Mobile Telecommunication System (UMTS), and/or the Global System for Mobile (GSM) CDMA2000 and/or Evolution-Data Optimized (EV-DO). Other examples may be implemented within systems employing IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 4, 5, 6, 7, 16, and 19 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless node, comprising:

a processing system configured to:

generate a first frame comprising a first information element, the first information element including a first bitmap indicating a first plurality of links, the first information element further including a first sub-element field that includes first management information to be applied to each link of the first plurality of links indicated by the first bitmap, the first management information comprising first target wait time information, wherein:

the first frame further comprises a second information element, the second information element including a second bitmap indicating the first plurality of links that are also indicated by the first bitmap, the second information element further including a second sub-element field including second management information to be applied to each link of the first plurality of links indicated by the second bitmap, the second management information comprising second target wait time information, the first management information is different from the second management information, the first management information further comprises first link recommendation information, and the second management information further comprises second link recommendation information different from the first link recommendation information; and at least one transceiver configured to transmit the first frame to a second wireless node.

2. The first wireless node of claim 1, wherein the first frame comprises at least one action frame that includes the first information element.

3. The first wireless node of claim 1, wherein the processing system is further configured to:

set at least one bit of the first bitmap to indicate at least one link of the first plurality of links to which the first management information applies.

4. The first wireless node of claim 1, wherein the first frame further comprises third management information that precedes the first information element and that is applicable to a currently active link used by the first wireless node for communication with the second wireless node or to all multi-level links associated with the first wireless node.

5. The first wireless node of claim 1, wherein the first frame further comprises third management information that precedes the first information element within the first frame, the third management information to be applied to at least one link other than each link of the first plurality of links indicated by the first bitmap.

6. The first wireless node of claim 5, wherein:

the first frame further comprises a third information element that follows the first information element within the first frame;

the third information element includes a third bitmap; and the third information element further includes a third sub-element field including fourth management information to be applied to each link of a second plurality of links indicated by the third bitmap.

7. The first wireless node of claim 6, wherein there is no overlapping information among the first management information, the third management information, and the fourth management information.

8. The first wireless node of claim 6, wherein the at least one link is different from each link of the second plurality of links indicated by the third bitmap.

9. The first wireless node of claim 5, wherein the at least one link is a currently active link used by the first wireless node for communication with the second wireless node.

10. The first wireless node of claim 5, wherein the at least one link comprises all multi-level links associated with the first wireless node.

11. The first wireless node of claim 1, wherein the first wireless node is configured to operate as a station.

12. The first wireless node of claim 1, wherein there is no overlapping information between the first management information and the second management information.

13. A first wireless node, comprising:

at least one transceiver; and a processing system configured to:

receive, via the at least one transceiver, a first frame comprising a first information element, the first information element including a first bitmap indicating a first plurality of links, the first information element further including a first sub-element field that includes first management information to be applied to each link of the first plurality of links indicated by the first bitmap, the first management information comprising first target wait time information, wherein:

the first frame further comprises a second information element, the second information element including a second bitmap indicating the first plurality of links that are also indicated by the first bitmap, the second information element further including a second sub-element field including second management information to be applied to each link of the first plurality of links indicated by the second bitmap, the second management information comprising second target wait time information, the first management information is different from the second management information, the first management information further comprises first link recommendation information, the second management information further comprises second link recommendation information different from the first link recommendation information, and the at least one transceiver is further configured to transmit at least one second frame to a second wireless node via the first plurality of links based on the first information element.

14. The first wireless node of claim 13, wherein:

the at least one transceiver is further configured to transmit, based on the second management information, at least one third frame via each link of the first plurality of links indicated by the second bitmap.

15. The first wireless node of claim 13, wherein:

the first frame further comprises third management information that precedes the first information element and is applicable to a currently active link used by the second wireless node for communication with the first wireless node or to all multi-level links associated with the first wireless node; and the at least one transceiver is further configured to transmit, based on the third management information, at least one third frame via the currently active link used by the second wireless node or via all of the multi-level links associated with the first wireless node.

16. The first wireless node of claim 13, wherein:

the first frame further comprises third management information that precedes the first information element within the first frame, the third management information to be applied to at least one other link different from each link of the first plurality of links indicated by the first bitmap; and the at least one transceiver is further configured to transmit at least one third frame via the at least one other link based on the third management information.

17. The first wireless node of claim 16, wherein:

the first frame further comprises a third information element that follows the first information element within the first frame;

the third information element includes a third bitmap;

the third information element further includes a third sub-element field including fourth management information to be applied to each link of a second plurality of links indicated by the third bitmap; and the at least one transceiver is further configured to transmit, based on the third management information, at least one fourth frame via each link of the second plurality of links indicated by the third bitmap.

18. The first wireless node of claim 17, wherein the at least one other link is different from each link of the second plurality of links indicated by the third bitmap.

19. The first wireless node of claim 16, wherein:

the at least one other link is a currently active link used by the second wireless node for communication with the first wireless node; or the at least one other link comprises all multi-level links associated with the first wireless node.

20. The first wireless node of claim 13, wherein the first wireless node is configured to operate as an access point.

21. A method for wireless communication by a first wireless node, comprising:

generate a first frame comprising a first information element, the first information element including a first bitmap indicating a first plurality of links, the first information element further including a first sub-element field that includes first management information to be applied to each link of the first plurality of links indicated by the first bitmap, the first management information comprising first target wait time information, wherein:

the first frame further comprises a second information element, the second information element including a second bitmap indicating the first plurality of links that are also indicated by the first bitmap, the second information element further including a second sub-element field including second management information to be applied to each link of the first plurality of links indicated by the second bitmap, the second management information comprising second target wait time information, the first management information is different from the second management information, the first management information further comprises first link recommendation information, and the second management information further comprises second link recommendation information different from the first link recommendation information; and transmitting the first frame to a second wireless node.

* * * * *